(12) United States Patent
Leventis et al.

(10) Patent No.: US 12,281,202 B1
(45) Date of Patent: Apr. 22, 2025

(54) ORGANIC AND METALLIC AEROGELS, COMPOSITION FOR THE ORGANIC AND METALLIC AEROGELS, AND METHOD FOR MANUFACTURING THE ORGANIC AND METALLIC AEROGELS

(71) Applicant: AeroSylent, LLC, Plano, TX (US)

(72) Inventors: Nicholas Leventis, Rolla, MO (US); Chariklia Sotiriou-Leventis, Rolla, MO (US); Suraj Donthula, Rolla, MO (US); Gitogo Churu, Dallas, TX (US); Hongbing Lu, Plano, TX (US); Shruti Mahadik-Khanolkar, Portland, OR (US); Abhishek Bang, Portland, OR (US); Clarissa Wisner, Rolla, MO (US)

( * ) Notice: Subject to any disclaimer, the term of this patent is extended or adjusted under 35 U.S.C. 154(b) by 0 days.

(21) Appl. No.: 17/461,556

(22) Filed: Aug. 30, 2021

Related U.S. Application Data

(62) Division of application No. 14/681,984, filed on Apr. 8, 2015, now Pat. No. 11,104,764.

(Continued)

(51) Int. Cl.
C08G 73/02 (2006.01)
B22F 9/20 (2006.01)
(Continued)

(52) U.S. Cl.
CPC ............ C08G 73/0233 (2013.01); B22F 9/20 (2013.01); C08J 9/28 (2013.01); C08J 9/35 (2013.01);
(Continued)

(58) Field of Classification Search
CPC . C08G 73/0233; B22F 9/20; C08J 9/28; C08J 9/35; C08J 2201/038;
(Continued)

(56) References Cited

PUBLICATIONS

Mahadik-Khanolkar et al., "Polybenzoxazine Aerogels. 1. High-Yield Room-Temperature Acid-Catalyzed Synthesis of Robust Monoliths, Oxidative Aromatization, and Conversion to Microporous Carbons," Chemistry of Materials, 2014, 26, 1303-1317. (Year: 2014).*

(Continued)

*Primary Examiner* — K. Boyle
(74) *Attorney, Agent, or Firm* — Theodore F. Shields; Shiells Law Firm P.C

(57) ABSTRACT

A nanoporous aerogel comprising an acid-catalyzed, oxidatively aromatized PBO polymer. The nanoporous aerogel includes a benzoxazine moiety containing polybenzoxazine polymer with up-to six sites of cross-linking per unit is the product of the high yield, room temperature, and acid catalyzed synthesis method, as provided for herein. A method of producing the aerogel is providing that results in robust monoliths, oxidative aromatization, and conversion to nanoporous carbons for the provided aerogels. The PBO polymer may be co-generated as an interpenetrating network with a metal oxide network, wherein the PBO network serves as both a reactive template and as a sacrificial scaffold in the synthesis of the pure, nanoporous, monolithic metal aerogels, in an energy efficient method.

(Continued)

-continued

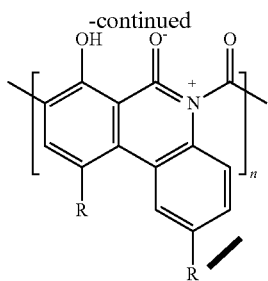

4 Claims, 24 Drawing Sheets

Related U.S. Application Data

(60) Provisional application No. 61/977,083, filed on Apr. 8, 2014.

(51) Int. Cl.
*C08J 9/28* (2006.01)
*C08J 9/35* (2006.01)
*C21D 1/26* (2006.01)
*C21D 1/74* (2006.01)
*C21D 9/00* (2006.01)

(52) U.S. Cl.
CPC ............... *C21D 1/26* (2013.01); *C21D 1/74* (2013.01); *C21D 9/0068* (2013.01); *C08J 2201/038* (2013.01); *C08J 2205/026* (2013.01); *C08J 2205/042* (2013.01); *C08J 2379/02* (2013.01)

(58) Field of Classification Search
CPC ............ C08J 2205/026; C08J 2205/042; C08J 2379/02; C21D 1/26; C21D 1/74; C21D 9/0068
See application file for complete search history.

(56) References Cited

PUBLICATIONS

Mahadik-Khanolkar et al., "Polybenzoxazine Aerogels. 2. Interpenetrating Networks with Iron Oxide and the Carbothermal Synthesis of Highly Porous Monolithic Pure Iron (0) Aerogels as Energetic Materials," Chemistry of Materials, 2014, 26, 1318-1331 (Year: 2014).*

Lorjai et al. "Porous structure of polybenzoxazine-based organic aerogel prepared by sol-gel process and their carbon aerogels," Journal of Sol-Gel Science and Technology, (2009) 52: 56-64, published online May 19, 2009. (Year: 2009).*

* cited by examiner

Heat-Induced Route

BO monomer
xx% w/w in DMSO 1. 80 °C, 2 h
2. pour in molds
3. 130 °C, (10 h – 4 days)

↓ wet-gels

1. age, 10 h – 4 days, 130 °C
2. wash, acetone, 6 × 8 h
3. dry, SCF $CO_2$

↓

PBO-H-xx-130

Acid (HCl)-Catalyzed Route

BO monomer
2 × xx% w/w in DMF

HCl (12.1 N) in DMF

→ sol → pour in molds, 1.5 – 7 h, R.T.

↓ wet-gels

1. age, 6 h – 1.2 days, R.T.
2. wash, DMF, 2 × 12 h
3. wash, acetone, 4 × 12 h
4. dry, SCF $CO_2$

↓

PBO-A-xx-RT

---

1. 160 °C, 1 h, air
2. 180 °C, 1 h, air
3. 200 °C, 24 h, air

↓

PBO-H- (or A-) xx-200

1. RT → 800 °C, 5 °C min$^{-1}$, Ar
2. 800 °C, 5 h, Ar
3. 800 °C → RT, 5 °C min$^{-1}$, Ar

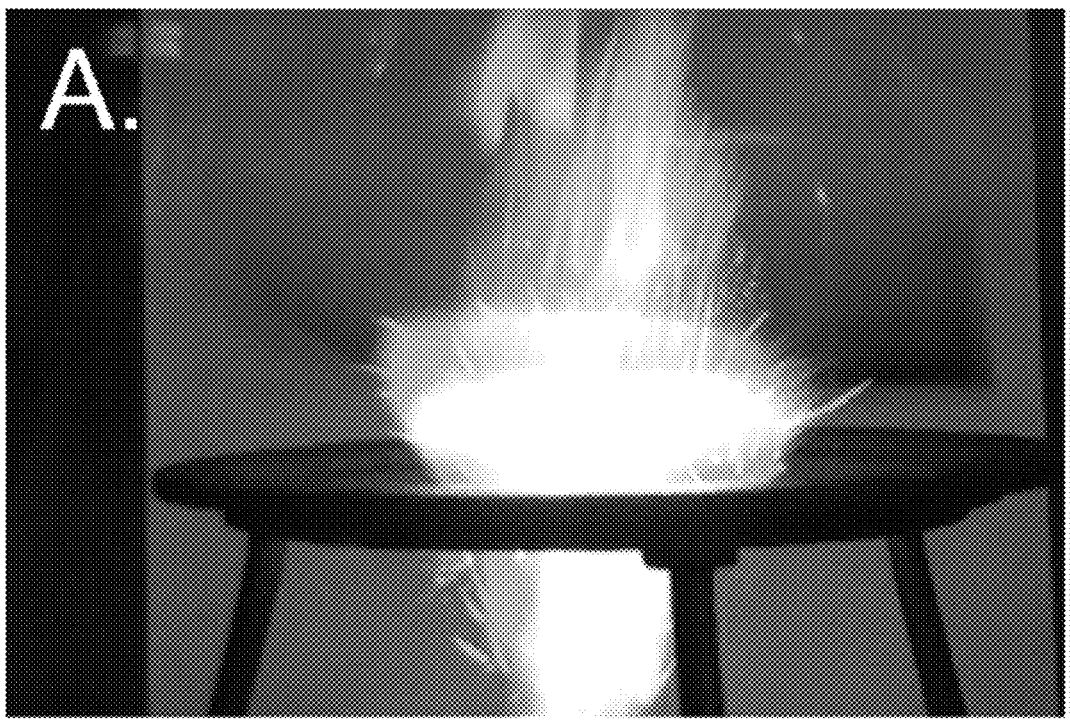
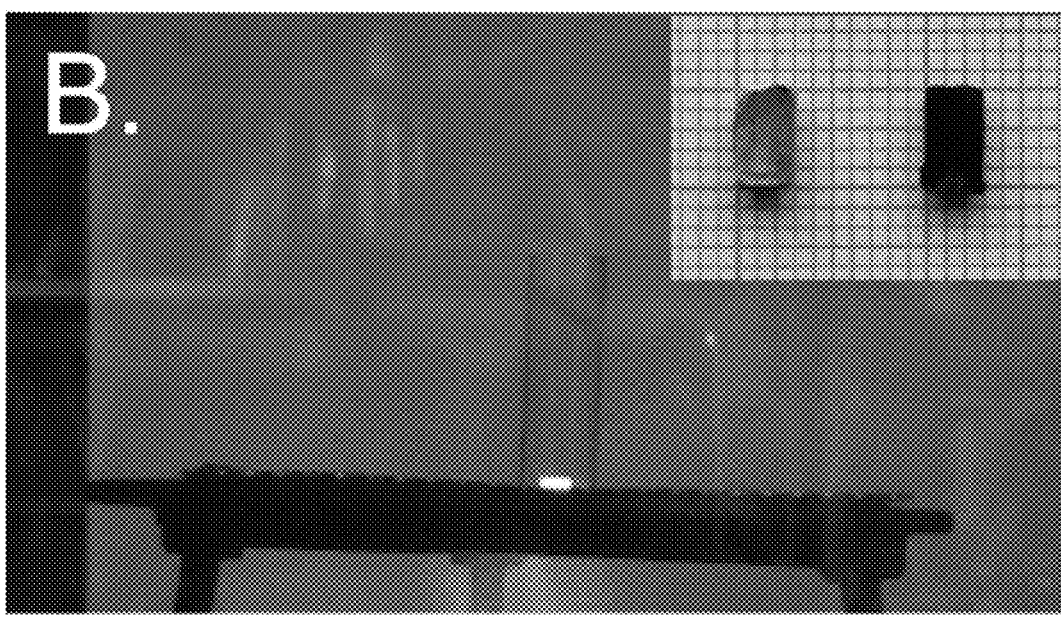
Figure 24

ORGANIC AND METALLIC AEROGELS, COMPOSITION FOR THE ORGANIC AND METALLIC AEROGELS, AND METHOD FOR MANUFACTURING THE ORGANIC AND METALLIC AEROGELS

UNITED STATES GOVERNMENT FUNDING

This invention was made with government support from the Army Research Office under Award Numbers W911NF-10-1-0476 and W911NF-12-2-0029 and from the National Science Foundation, Grant Number NSF-DMR-0907291. The government has certain right in the invention.

BACKGROUND OF THE INVENTION

Field of the Invention

The present invention relates generally to the field of aerogels. More specifically, it relates to certain organic aerogels synthesized under acid catalysis and their uses, and in production of pure, monolithic, and nanoporous metallic aerogels and their uses.

Description of Related Art

Aerogels are lightweight, three-dimensional (3D) assemblies of nanoparticles with large internal surface areas, high porosities and low thermal conductivities. Organic and inorganic aerogels were first reported together in 1931 by Kistler. Early studies focused on inorganic aerogels, mainly silica. Attention to organic aerogels picked up momentum after Pekala's synthesis of resorcinol-formaldehyde ("RF") aerogels in 1989. Since then, reports on several other classes of organic aerogels have been published, e.g., polyurethane, polyurea, and more recently polystyrene, poly(dicyclopentadiene) and polyimide aerogels. Organic aerogels are attractive mainly because of their easy one-step synthesis and freedom to choose properties by selecting a suitable monomer.

Polybenzoxazine (PBO) aerogels comprise a recent addition to the polymer aerogel family. As a polymeric class, PBOs possess high mechanical strength, high thermal stability, flame retardancy, and high glass transition temperatures ($T_g$). They can be considered as more economic alternatives to polyimides for high temperature thermal insulation in civil and transport applications. Upon pyrolysis, PBO aerogels yield robust carbon aerogels with high surface areas, hence most of the work on PBO aerogels has been concentrated on that direction.

Systematic development of PBOs began with Ning and Ishida's work in the mid-1990s. PBOs are typically prepared via thermally induced ring-opening polymerization of suitable benzoxazine (BO) monomers, whose benchmark has been Ishida's condensation product of bisphenol A, aniline, and formaldehyde (Scheme 1).

Scheme 1: Synthesis of Benzoxazine (BO) Monomer and the Generally Accepted Mode of Polymerization

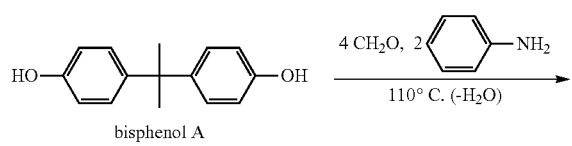

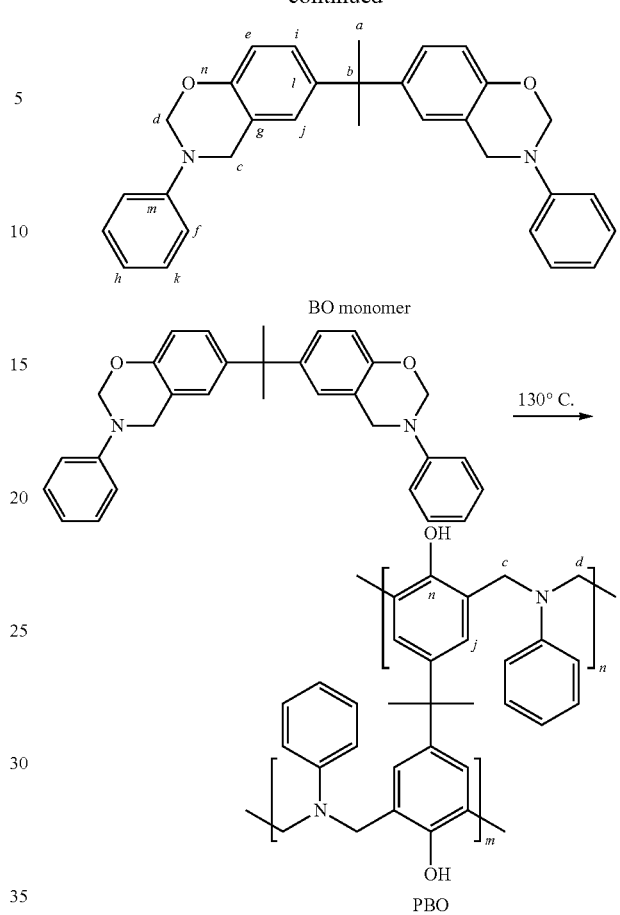

With an eye on porous carbons, macroporous polybenzoxazines have been described by Ninan et al. using templating with glass microballoons and by Lorjai et al. using azodicarbonamide as a foaming agent. Nanoporous PBOs via microphase separation were first reported by Chang et al. using a copolymer from Ishida's BO monomer (Scheme 1) and benzoxazine-terminated poly(ε-caprolactone) (PCL); removing the latter from the copolymer hydrolytically created pores. Mesoporous PBOs were obtained via reaction-induced phase separation applied in two modes. First, Chu et al., using blends of a block copolymer (PEO-b-PCL) with 4-hydroxybenzyl alcohol-based polybenzoxazines, demonstrated that formation of the latter forces phase-separation of PEO-b-PCL into cylindrical nano-structures that remain dispersed in PBO via strong intermolecular hydrogen bonding through their PEO segments; polybenzoxazines obtained after mild pyrolytic removal of PEO-b-PCL included significant microporosity, while the tubular mesopores were reminiscent of silicas templated with similar block copolymers employed as surfactants. In a second approach, Lorjai et al., using sol-gel processing of Ishida's BO monomer in xylene at 130° C. for 96 h, obtained wet-gels that were dried into PBO aerogels.

The present invention is generally directed to aerogel nanoporous PBOs and their uses. These aerogels are biocompatible and their potential applications include serving as tissue engineering scaffolds. Further, PBO aerogels can be pyrolyzed to mesoporous carbons with yields higher than those of the bulk polymer (e.g., 51% w/w versus 27% w/w, respectively). In other words, PBO aerogels are emerging as a viable alternative to resorcinol-formaldehyde (RF) aerogels, which have been the main carbon aerogel precursors.

While both PBOs and RF are phenolic resins, the high-temperature processing of PBOs has historically been more energy intensive. The present inventors have recognized, however, that it is desirable to identify novel time and energy efficient techniques for processing PBOs. In that regard, some prior studies have suggested that, at elevated temperatures, polymerization of benzoxazines can be assisted with both strong and weak carboxylic acids, phenols (thereby benzoxazine ring-opening is an autocatalytic process), and cationic initiators, for example Lewis acids such as $PCl_5$, $PCl_3$, $TiCl_4$, and $AlCl_3$, and anhydrous metal ions (e.g., $FeCl_3$ and lithium salts). Those studies did not encompass the effect of protic inorganic acids on polymerization of aerogel benzoxazines.

Therefore, it is an object of the present invention to identify novel methods for producing PBO based aerogels in a time and cost effective manner.

It is a further object of the present invention to synthesize PBO based aerogels that are equivalent or better, in comparison to their thermally polymerized counterparts, as to their cross-linking, mesoporosity, surface areas, mechanical strength and thermal conductivity.

It is a further object of the present invention to synthesize nanoporous metallic aerogels in a more time and energy effective manner, using the acid catalyzed PBO aerogels as interpenetrating scaffolds.

As to nanoporous metallic aerogels, there are quite a few reports on non-supported porous monolithic metals. Armor et al. synthesized the first metallic copper aerogels from cupric acetate and water followed by hypercritical removal of the pore-filling solvent (methanol at 270° C.). That method was extended to metallic gold and Cu/Pd alloys. More recently, platinum, gold, and silver aerogels were synthesized via destabilization of colloidal solutions of the metal, and copper nanowire aerogels were made via freeze-drying of copper nanowire solutions. Gold, silver, palladium, platinum, copper, nickel, bismuth and some mixed alloys are pursued mainly for their applications in catalysis, fuel cells, electrodes for ultrasensitive quartz crystal microbalance, sensors, actuators, and antibacterial biofiltration membranes.

Fuel in energetic materials (EMs) is a major potential application of several porous pyrophoric metals such as iron, copper, magnesium, zircomium, and nickel. Those metals, in combination with oxidizers, undergo solid-state redox reactions with rapid energy release. Typical oxidizers are metal oxides in nanoparticulate form for better contact with the fuel.

Conventionally, EMs are prepared by grinding together the dry fine powders of the two reactants (oxidizer and oxophilic metal), which can be extremely hazardous. It is thus recognized that the sol-gel approach not only avoids the hazard of mixing, but also facilitates homogenous dispersion of the two phases through ultrafine particle formation in situ. The first energetic nanocomposite in aerogel form was prepared by Tillotson and co-workers, by suspending aluminum nanoparticles (or microparticles) in iron oxide sols just about to undergo gelation. Kim et al. also emphasized the importance of homogenous mixing of two phases in order to achieve rapid energy release. In that regard, porosity, surface area and homogenous distribution, all have strong impact on the combustion rate. Large surface area due to small particles and high porosity in the mesoporous range result in efficient dispersion of two components that, in turn, increase contact and improve the reaction rate.

Nanoparticles of metallic iron get oxidized immediately upon exposure to air and release tremendous amount of energy within a fraction of a second, hence making them of interest for use as aircraft decoy flares. In such efforts to make pyrophoric materials, Merzbacher et al. deposited iron on the pores of resorcinol-formaldehyde (RF) aerogels and their carbon derivatives by passing iron pentacarbonyl (Fe$(CO)_5$) vapors through said pores. That method has been simplified by Gash and co-workers via impregnation of iron dopant liquid (or any other metal dopant) into the pores of carbon aerogels. Another approach involved reduction of iron oxide networks in a hydrogen atmosphere yielding sub-micron sized iron particles, which were not immediately pyrophoric (because of passivation layer of iron oxide) but upon heating undergo oxidation readily.

Previously, the present inventors reported synthesis of metal nanostructures via co-gelation of RF and metal oxide networks. Pyrolysis of such interpenetrating networks resulted in smelting of the metal oxides, yielding metal aerogels supported on carbon. That process was improved by polymer coating (X-linking) of the interpenetrating network. The polymer melts at relatively low temperature (400° C.) and causes collapse of the network that further enhances homogenous mixing of nanoparticles, and results in much lower smelting temperature.

In energetic materials, small amount of impurities act as energy traps and retard the combustion wave speed. Fabrication of pure metallic materials without hampering their aerogel properties is a challenge for the sol-gel method; that challenge is, in part, solved by the present invention.

SUMMARY OF THE INVENTION

These objects and advantages are achieved in accordance with the present invention, and methods of synthesis, which provide new processes that are both time- and energy-efficient, as designed. The resulting polybenzoxazine (PBO) aerogels are chemically similar, yet distinguishably different from and more robust than those obtained via the typical heat-induced polymerization process of Scheme 1.

The inventors were able to advance the art by catalyzing the gelation of Ishida's BO monomer (Scheme 1) using a strong inorganic acid (for example, concentrated aqueous HCl) as an acid catalyst at room temperate. FIG. 1 summarizes the present invention method (Acid Catalyzed Route) for synthesis of PBO aerogels, as well as their carbonization, and graphitization, to the Heat-Induced method contained in the prior art. The striking difference of the two methods is that the acid (i.e., HCl)-catalyzed process induces gelation of the PBO polymer at room temperature in a few hours, in contrast to the thermal process that requires on average a few days.

In accordance with another aspect of an embodiment of the invention, i.e., acid catalyzed PBO polymer, departs significantly from the conventional (heat induced) polymer structure, as depicted in Scheme 1, which, therefore, needs to be modified in order to account for polymerization through para-coupling of aniline. This is reconciled based on the generally accepted mode of the benzoxazine ring-opening into an iminium ion (Scheme 2), which, in a low-activation environment (room temperature), undergoes electrophilic aromatic substitution at the activated para position of the aniline moiety, rather than at the sterically hindred ortho position of bisphenol A. According to 1H NMR, the ortho position of phenol (pointed with an arrow in Scheme 2) is also engaged eventually by iminium electrophiles, resulting in a more tightly cross-linked polymer, wherein each repeat BO monomer unit has six points of attachment versus four in the heat-induced process.

Scheme 2: Mechanism of Acid-Catalyzed Polymerization of the BO Monomers

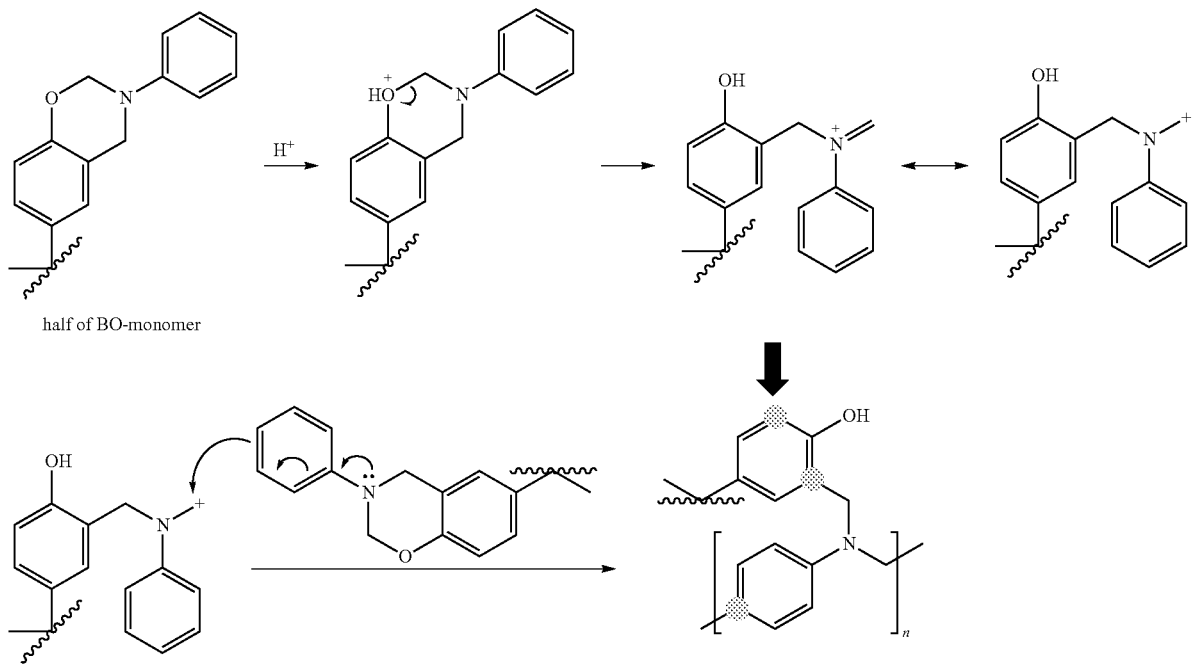

In accordance with another aspect of an embodiment of the invention, the acid-catalyzed process imposes additional cross-linking that result in smaller skeletal particles, with increased surface areas and reduced thermal conductivity (i.e., enhanced thermal insulation properties).

In accordance with another aspect of an embodiment of the invention, the acid catalyzed aerogel forms interpenetrating networks with metallic compounds, that upon smelting produce highly porous and monolithic metallic aerogels, and whose porosity may be modulated by modifying the annealing temperature.

BRIEF DESCRIPTION OF THE DRAWINGS

For a more complete understanding of the present invention and the advantages thereof, reference is now made to the following Detailed Description taken in conjunction with the accompanying drawings, wherein:

FIG. 1 is a flow diagram comparing the Heat-induced and Acid-Catalyzed Routes for organic aerogel synthesis;

Figure 14:
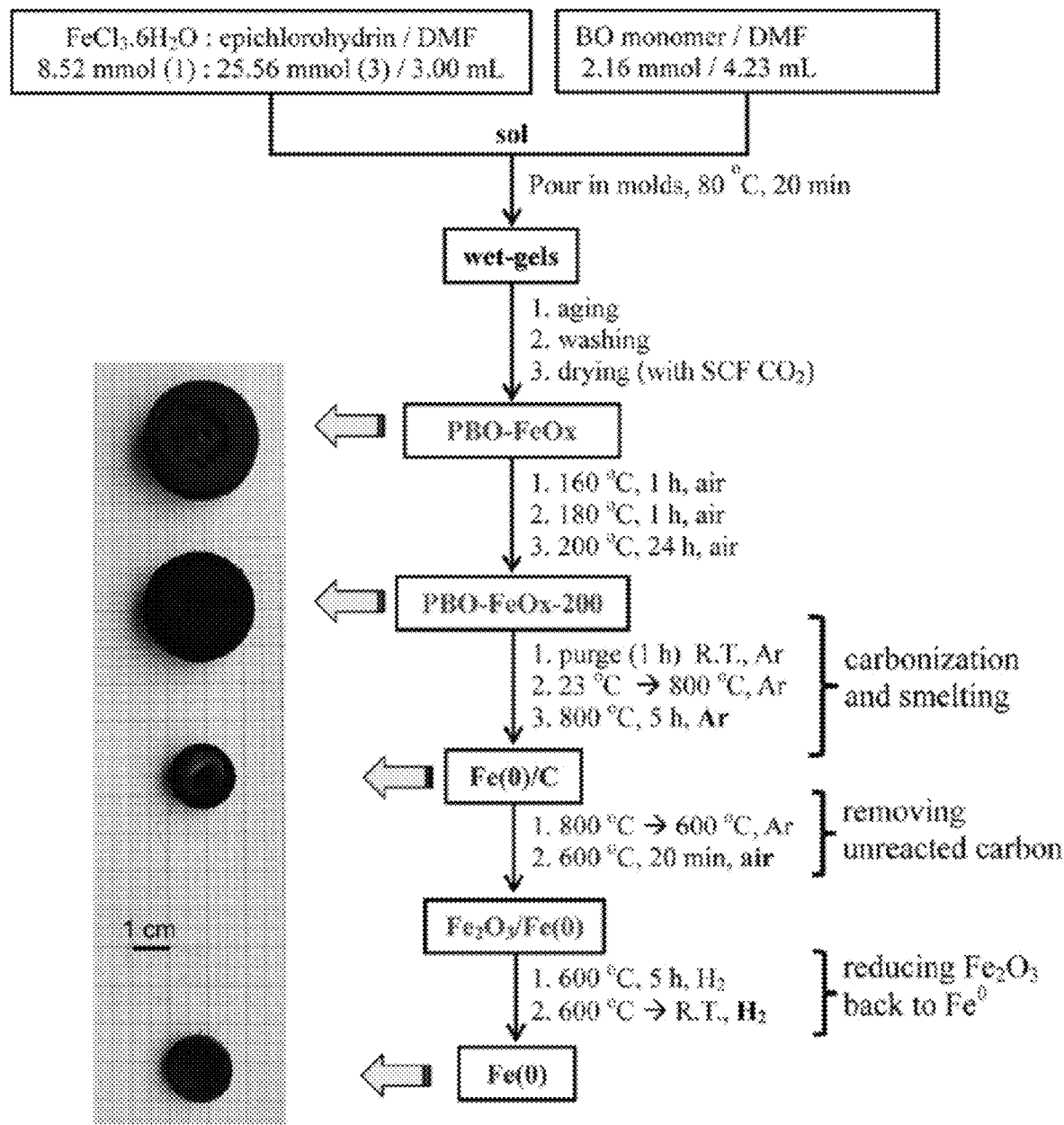
Figure 15:
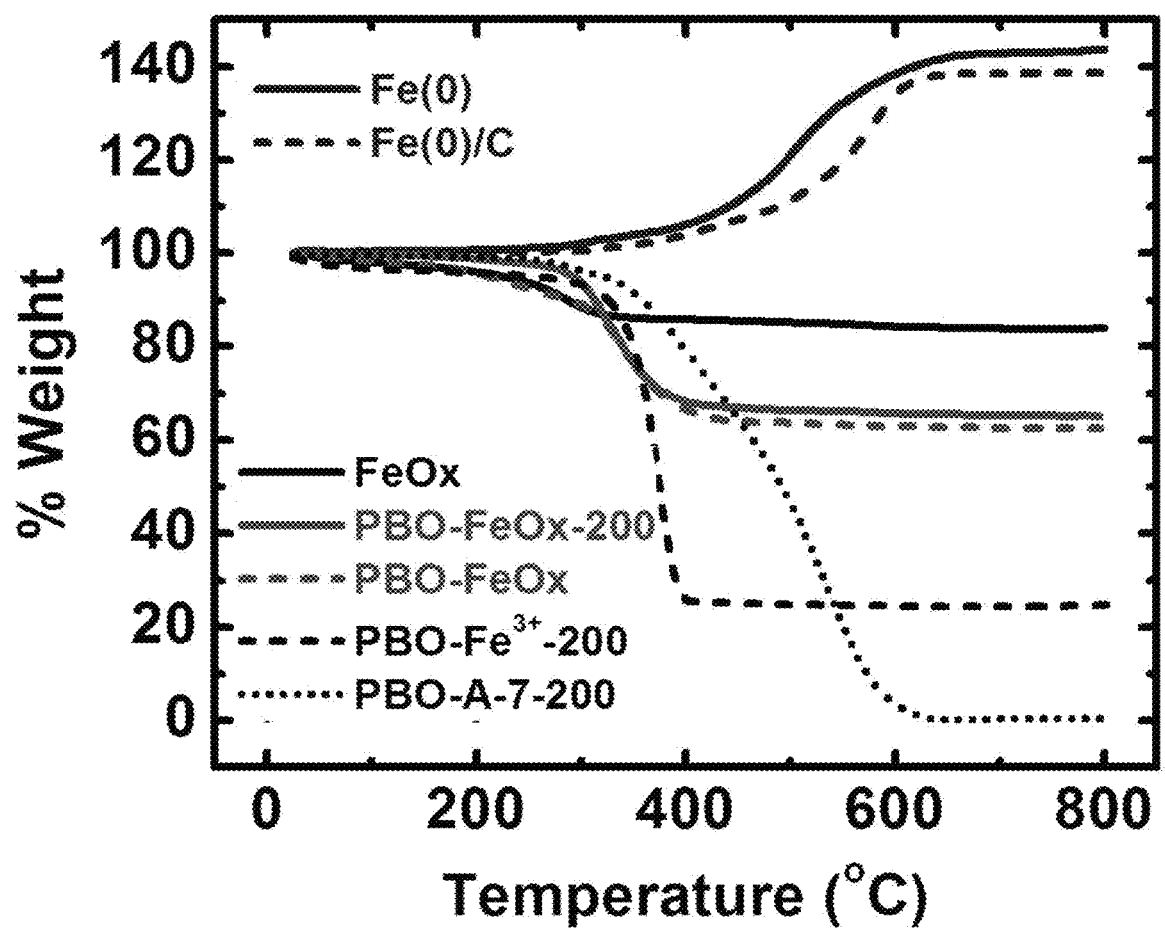
Figure 16:
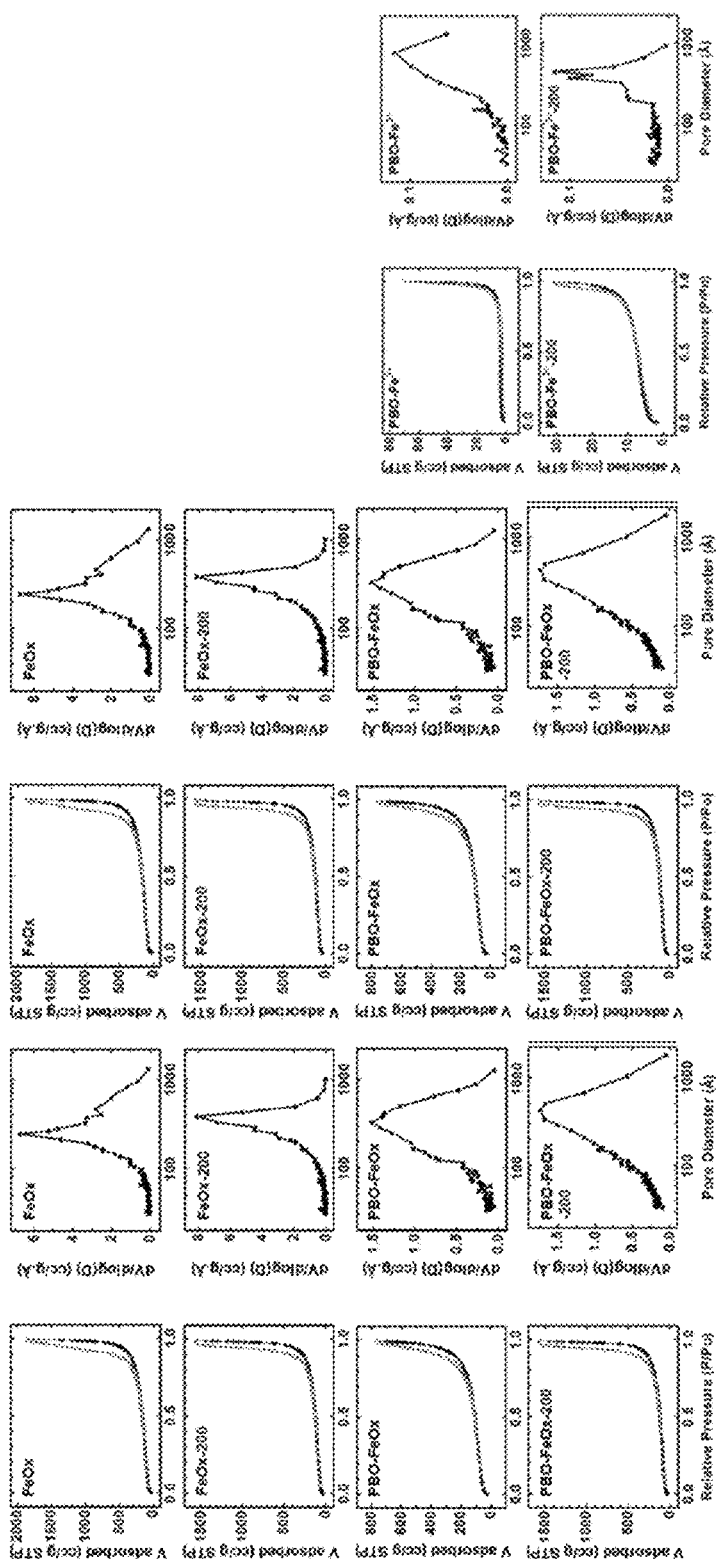
Figure 17:
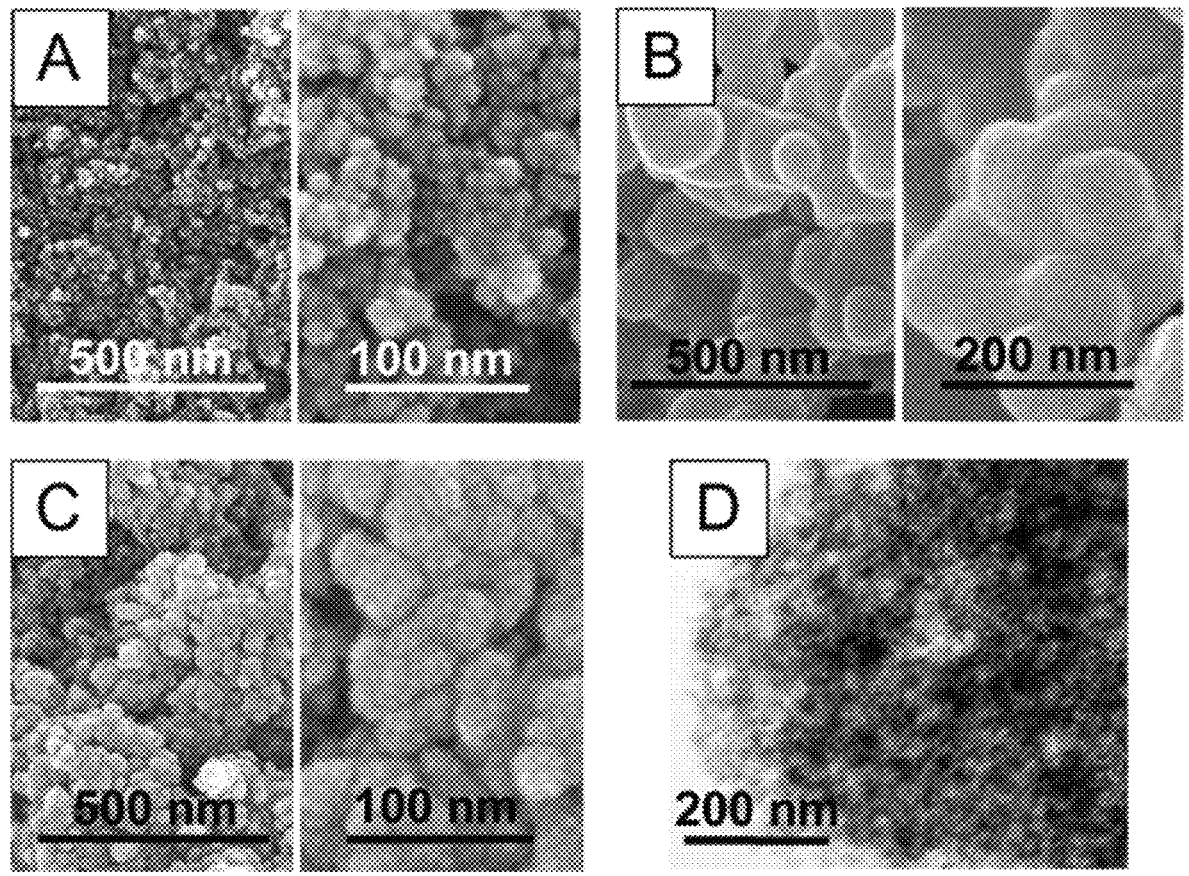
Figure 18:
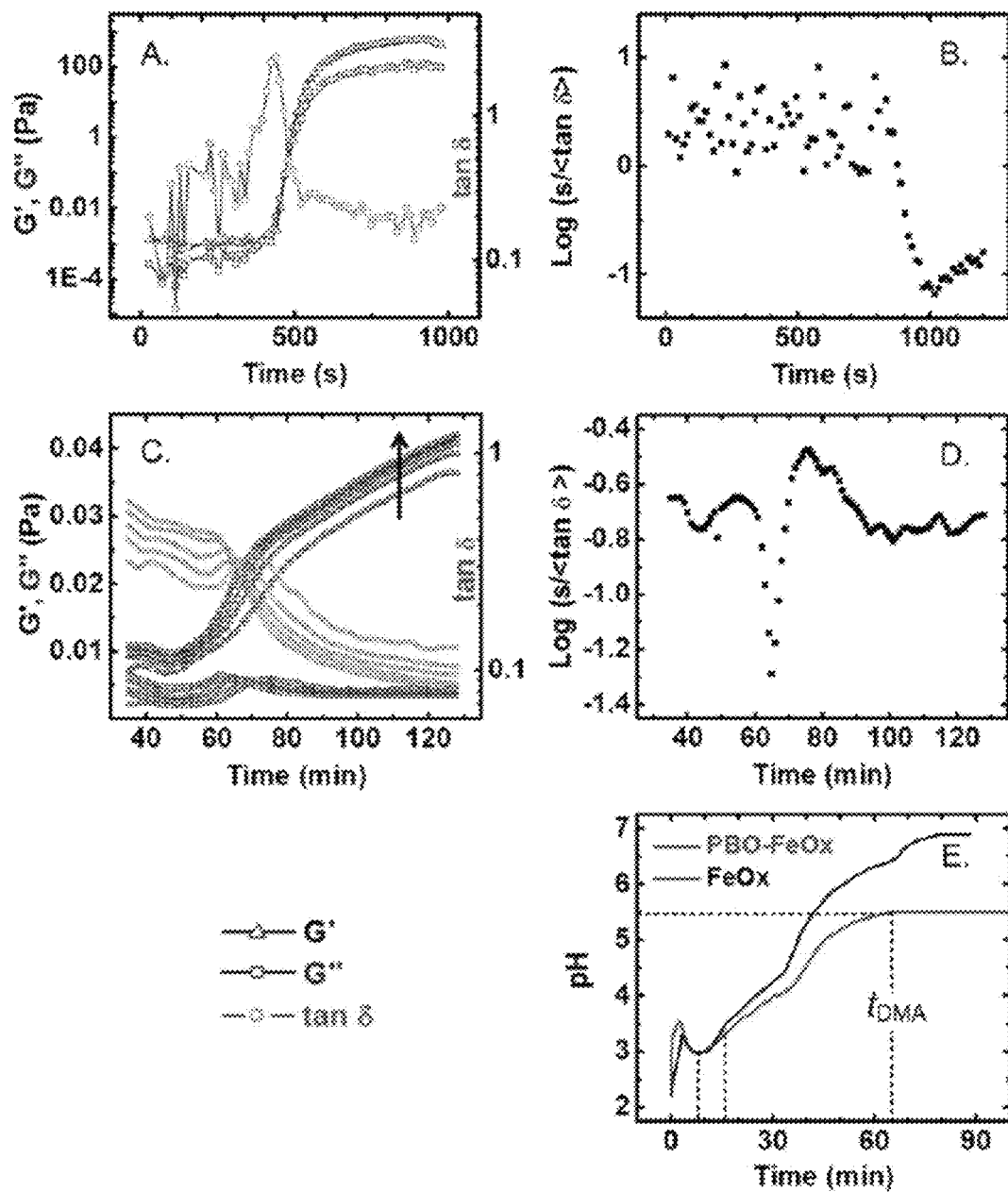
Figure 19:
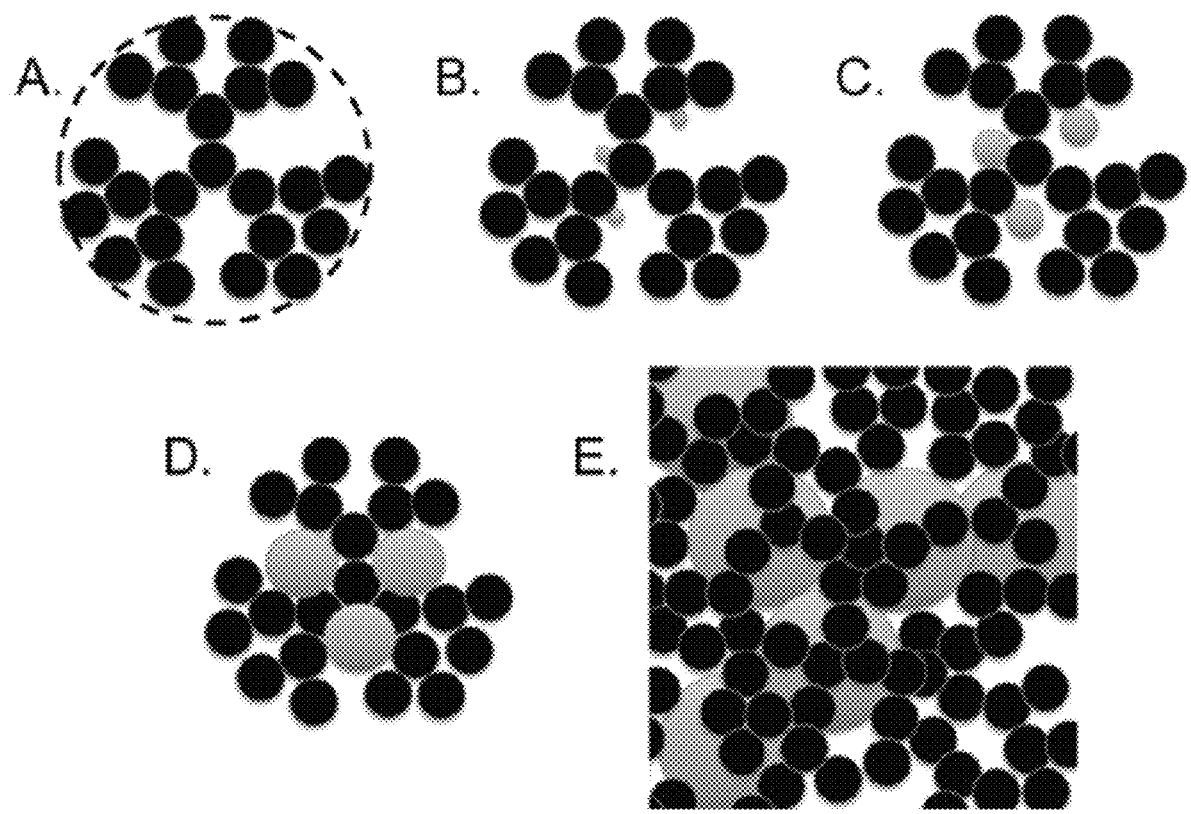
Figure 20:
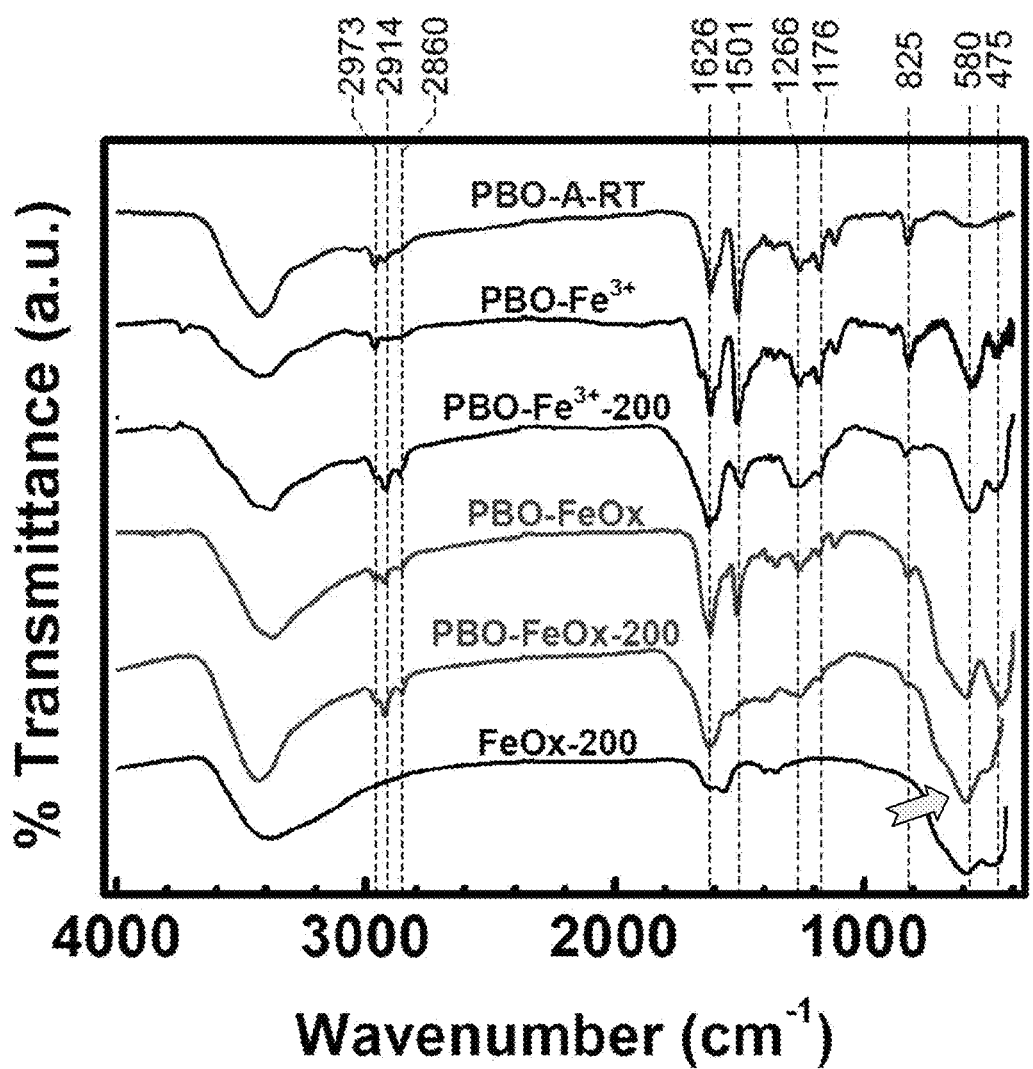
Figure 21:
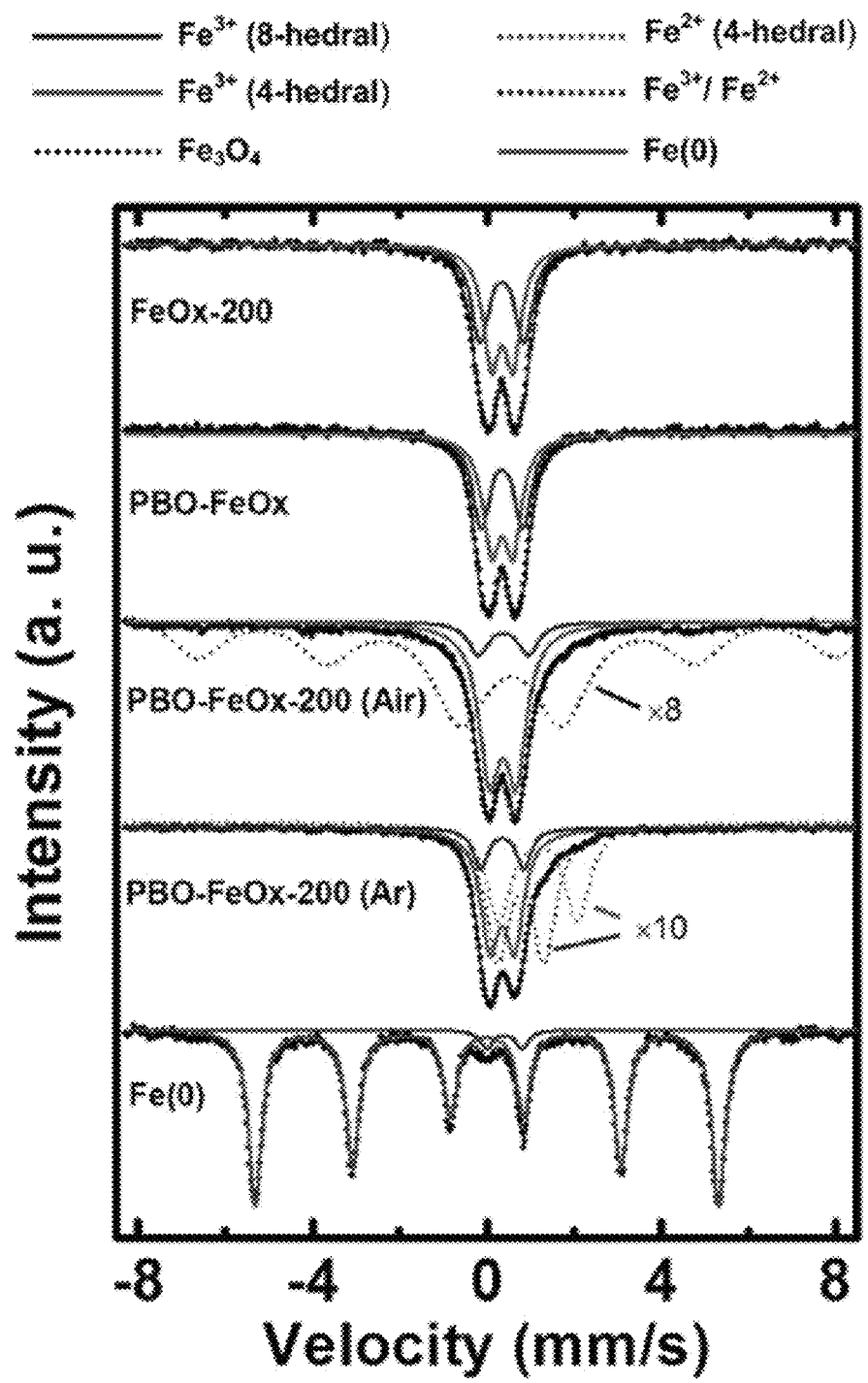
Figure 22:
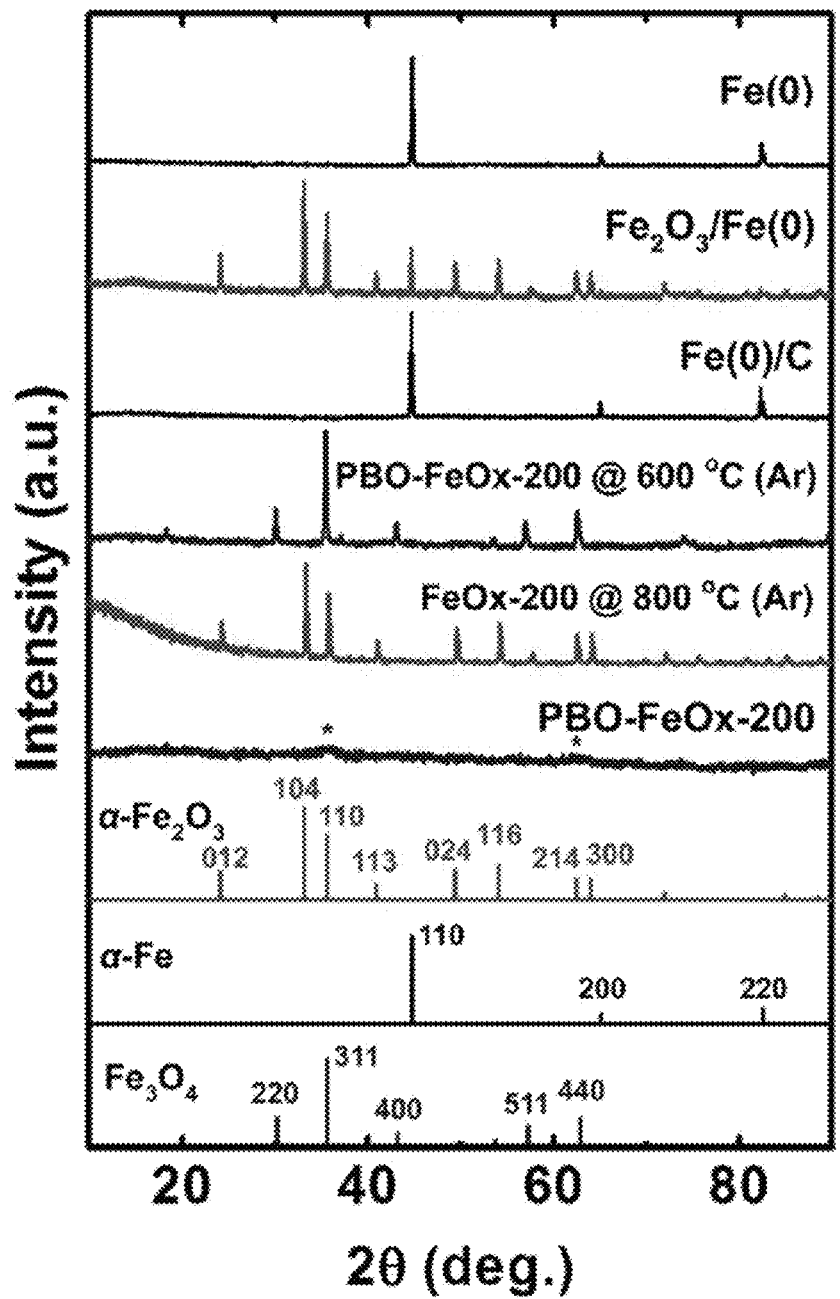
Figure 23:
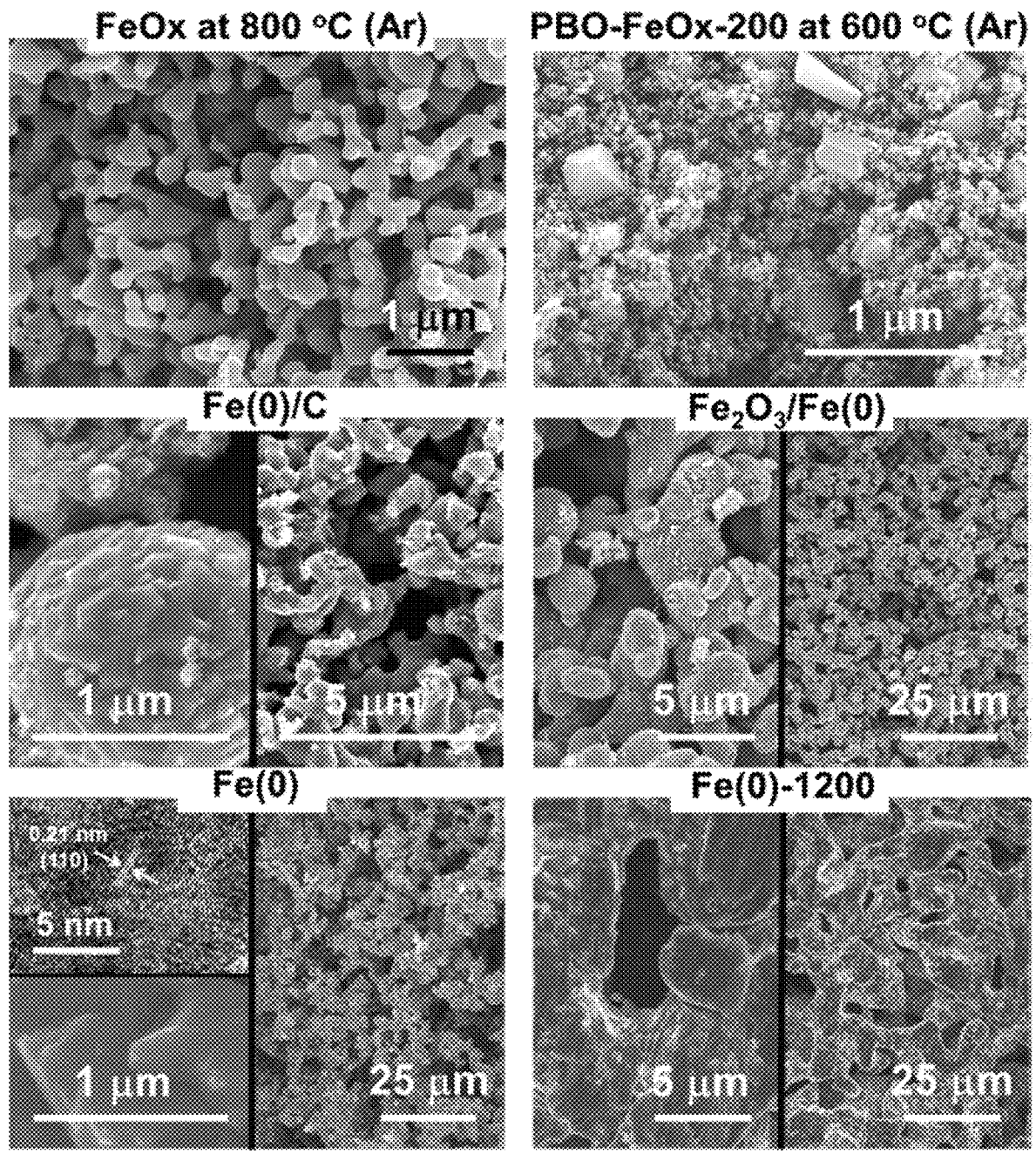

Left: isotherms. Right: pore size distributions of micropores from the low-pressure ($P/P_o \ll 0.1$) part of the isotherms, and of mesopores from the high partial pressure branch of the desorption isotherms ($P/P_o \sim 1$);

FIG. 14 is a flow chart depicting the synthesis of nanoporous metallic aerogels, as exemplified by Iron (Fe) in this diagram;

FIG. 15 is a graph depicting thermogravimetric analysis of PBO-FeOx aerogels and controls as shown in air;

FIG. 16 is a set of graphs depicting $N_2$-sorption data for all samples;

FIG. 17 is a set of SEM pictures, at different magnifications, of various metallic aerogels;

FIG. 18 is a set of graphs depicting Rheology analyses;

FIG. 19 is a schematic for the fractal network of primary particles;

FIG. 20 is a FTIR spectra of PBO-FeOx aerogels and controls as-prepared and after curing at 200° C. in air. The spectrum of an as-prepared acid-catalyzed PBO aerogel (PBO-A-RT) is included for comparison. Arrow points to the lattice vibration of $Fe_3O_4$;

FIG. 21 is a Mossbauer spectra (black solid lines) of the PBO-FeOx aerogels and controls, as indicated;

FIG. 22 is an X-ray diffraction (XRD) data for interpenetrating networks and controls along processing as shown. Relevant line spectra are shown at the bottom;

FIG. 23 is a set of SEM images, some at two different magnifications along processing of PBO-FeOx aerogels and controls, as shown. A TEM image of Fe(0) is also included; and, FIG. 24 are images of (A) An exploding Fe(0)/LiClO$_4$ sample (iron(0):LiClO$_4$=1:0.395 mol/mol) ignited with a burner. (B) A Fe(0)-1200/LiClO$_4$ sample behaving as a thermite. Inset: Photograph on a millimeter paper of a Fe(0)-1200/LiClO$_4$ sample before ignition (left) and another one after testing (right). As shown, the latter remained monolithic.

DETAILED DESCRIPTION

In the following discussion, numerous specific details are set forth to provide a thorough understanding of the present inventions. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning installation procedures, materials, and the like, have been omitted to the extent that such details are not considered necessary to obtain a complete understanding of the present invention, and are considered to be within the understanding of persons of ordinary skill in the relevant art.

Turning now to the drawings, and initially to FIG. 1 thereof, a flow diagram comparing the Heat induced (as described in prior art) and the Acid-Catalyzed Routes of synthesis, is depicted, wherein the acid-catalyzed route is exemplified by HCl, though it represents any strong inorganic acid with a $pK_a<4$. The striking difference of the two routes is that the acid-catalyzed process induces gelation at room temperature in a few hours, in contrast to the thermal process that requires on average a few days. The heat-induced (H-) method works equally well in DMF and DMSO. For demonstrating the acid-catalyzed (A-) route we opted for DMF sols. H-gels were aged for periods equal to their gelation times and A-gels for periods equal to 4× their gelation times. Gelation solvents were exchanged with acetone, and wet-gels were dried into aerogels with liquid $CO_2$, taken out at the end as a supercritical fluid (SCF), consistent with the manner detailed in the prior art. Typically, PBOs obtained via heat-induced polymerization have been step-cured without any particular precautions (i.e., in air) at temperatures up to 200° C. For direct comparison, acid-catalyzed aerogels were treated similarly. Subsequently, cured samples by either route were pyrolyzed at 800° C. under flowing Ar.

Samples processed up to 200° C. are referred to as PBOs, and the sample names, PBO-H-(or A-) xx-temperature, describe the gelation process (H-, heat; A-, acid catalysis), the weight percent of the BO monomer in the sol (-xx-), and the process temperature. (All formulations including molar concentrations and gelation times are provided in Table 1.) According to this convention, as-prepared H-samples are denoted as PBO-H-xx-130 and as-prepared A-samples as PBO-A-xx-RT (RT: room temperature). -xx- was varied from 5 to 40%; outside that range, gels were either too soft to handle or the BO monomer could not be dissolved completely. All carbon aerogels are referred to as C-; the H-, A-, and -xx- descriptors are retained in order to show the origin of the samples. For consistency, the process temperature (800° C.) is also included in the sample names. Both as-prepared H- and A-aerogels look and feel very similar: brown, monolithic, and sturdy. Step-curing of H-samples is presumed to complete the polymerization process.

TABLE 1

Formulation and apparent gelation times of PBO sols
Part A. Acid-catalyzed route [a]

| Formulation | BO monomer (g [mmol]) | Aqueous HCl 12.1N HCl (g [mL]) | DMF (g [mL]) | [BO monomer] (% w/w [M]) | Apparent gelation time |
|---|---|---|---|---|---|
| PBO-A-5-RT | 1.00 [2.16] | 1.04 [0.94] | 19.9 [21.08] | 4.56 [0.09] | ~7 h |
| PBO-A-7-RT | 1.62 [3.50] | 1.04 [0.94] | 19.9 [21.08] | 7.18 [0.14] | ~5 h 30 min |
| PBO-A-10-RT | 2.22 [4.80] | 1.04 [0.94] | 19.9 [21.08] | 9.59 [0.20] | ~3 h 20 min |
| PBO-A-12-RT | 2.85 [6.16] | 1.04 [0.94] | 19.9 [21.08] | 11.98 [0.25] | ~2 h 30 min |
| PBO-A-15-RT | 3.52 [7.61] | 1.04 [0.94] | 19.9 [21.08] | 14.39 [0.30] | ~2 h |
| PBO-A-20-RT | 5.00 [10.81] | 1.04 [0.94] | 19.9 [21.08] | 19.27 [0.41] | ~1 h 30 min |

TABLE 1-continued

| | Part B. Heat-induced polymerization [a] | | | |
|---|---|---|---|---|
| Formulation | BO monomer (g [mol]) | DMSO (g [mL]) | [BO monomer] (% w/w [M]) | Apparent gelation time |
| PBO-B-5-130 | 1.00 [2.16] | 19 [17.27] | 5.00 [0.12] | 3-4 days |
| PBO-B-10-130 | 2.00 [4.32] | 18 [16.36] | 10.00 [0.24] | 2.5-3 days |
| PBO-B-15-130 | 3.00 [6.49] | 17 [15.45] | 15.00 [0.36] | 2-2.5 days |
| PBO-B-20-130 | 4.00 [8.65] | 16 [14.55] | 20.00 [0.48] | 1.5-2 days |
| PBO-B-30-130 | 5.97 [12.90] | 14 [12.73] | 29.89 [0.73] | ~1 day |
| PBO-B-40-130 | 10.00 [21.62] | 15 [13.64] | 40.00 [0.98] | 10-12 h |

Figure 2:
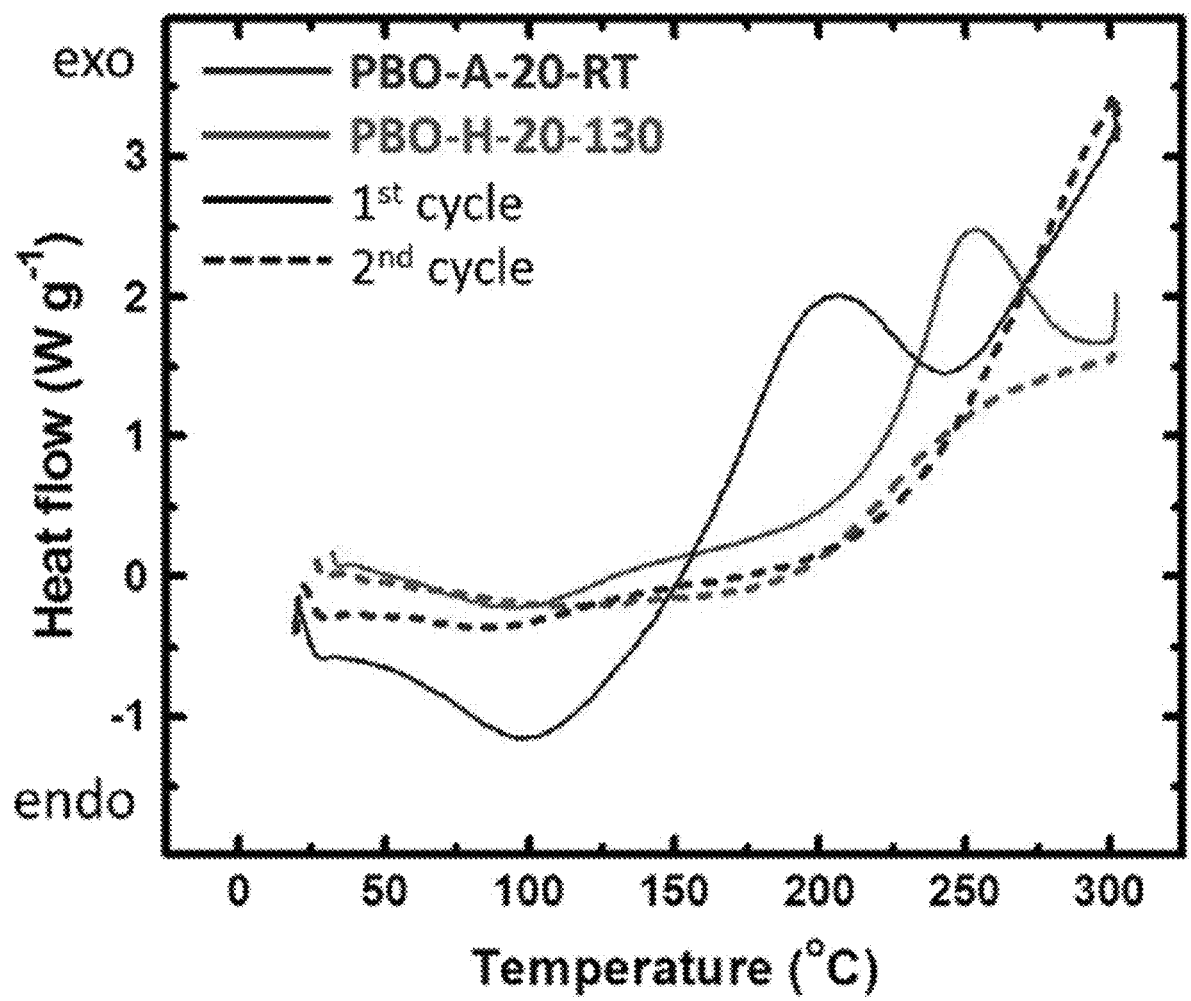
FIG. 2 is a graph of differential scanning calorimetry (DCS) in the air at 10° C. min$^{-1}$ of representative PBO aerogel samples.

[a] The calculation of [BO monomer] requires the BO monomer density = $1.185 \pm 0.007$ g cm$^{-3}$ With reference to FIG. 2, depicting graphs of differential scanning calorimetry (DSC), it is noted that the exotherms of the heat-induced (H-) and the acid catalyzed (A-) materials are distinctively different, implying a significant chemical differentiation between the H- and A-process. Furthermore, taking as-prepared PBO-A-xx-RT samples directly into the carbonization furnace under Ar, i.e., by circumventing the curing process in air, causes severe deformation and the resulting materials look like blown foams (FIG. 3).

Figure 3:
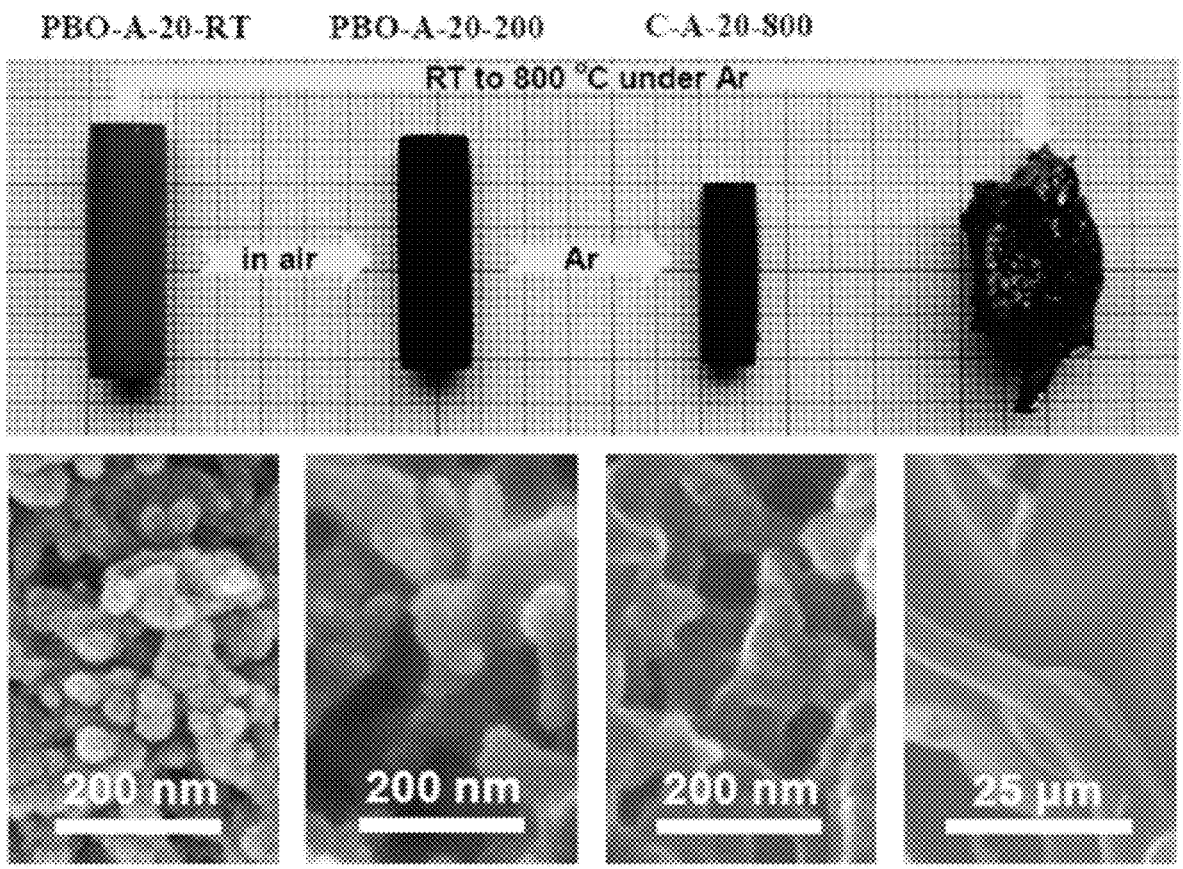
FIG. 3 is an set of optical photographs and the corresponding Scanning Electron Microscopy (SEM) images of representative PBO aerogel monoliths at identified stages of processing.

As depicted in FIG. 3, microscopically, PBO-A-20-RT are particulate and nanoporous; that microstructure is retained in PBO-A-xx-200, albeit some particle coalescence and fusion seem to have occurred; that appearance is retained by the C-A-xx-800 samples. On the other hand, PBO-A-xx-RT samples taken directly to 800° C. under Ar are no longer particulate or nanoporous. Curing by heat treatment at between approximately 130° C. to approximately 250° C., and preferably approximately 200° C., in the air is necessary in order to fix the microstructure, and oxygen plays an important role in this process.

Figure 4:
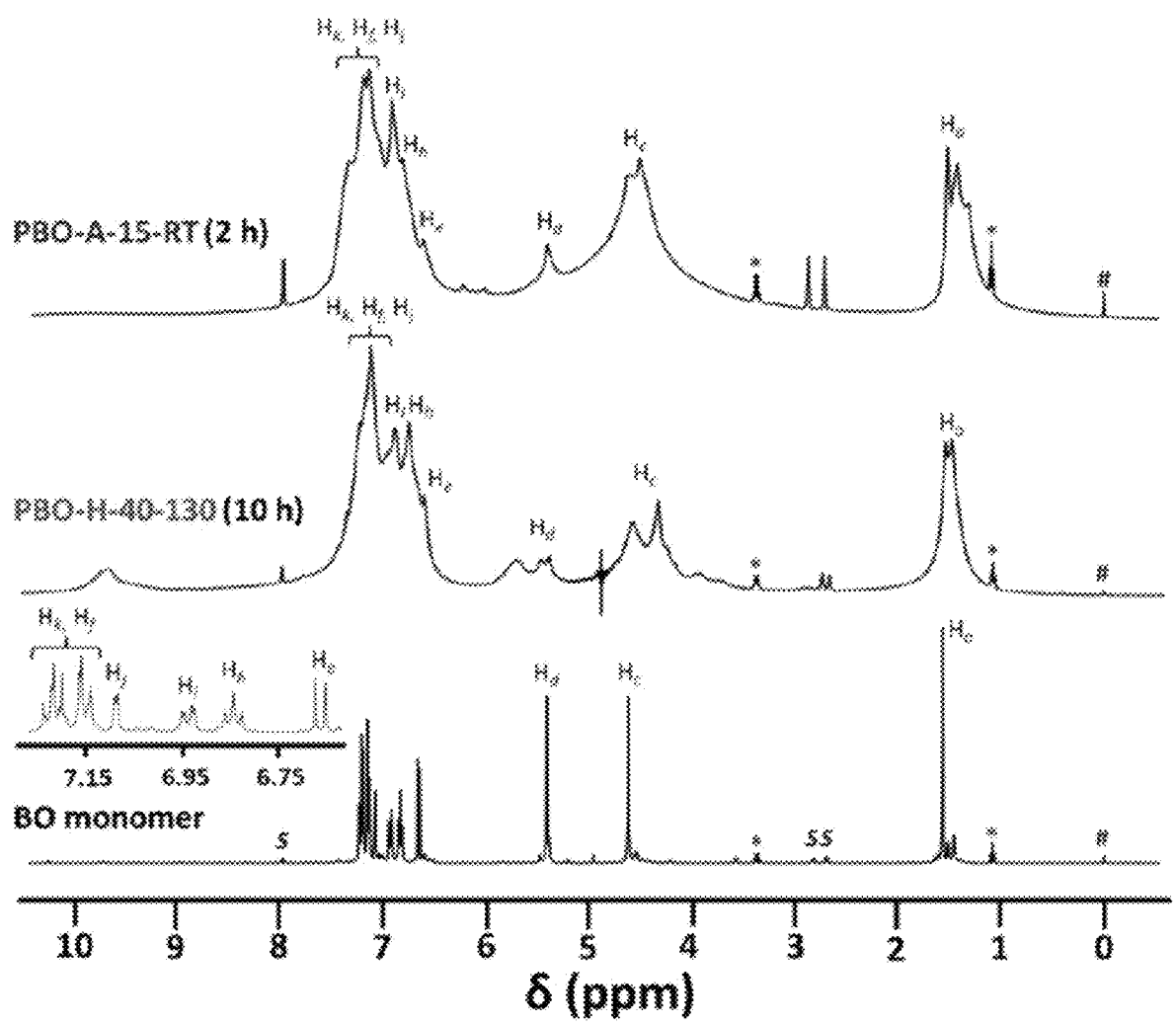
FIG. 4 is a 1H NMR of the BO monomer in DMF-d$_7$ and of two representative sols, also in DMF-d$_7$, with the formulations shown at their respective gelation points (in parentheses). Acid-catalyzed PBO-A-15-RT gelled at room temperature, while the heat-polymerized PBO-H-40-130 gelled at 130° C. "S" denotes solvent.

As depicted in FIG. 4, the $^1$H NMR spectroscopy reveals that the intensity of He protons in the ortho-position of phenolic Oxygen has been diminished in both H- and A-sols as expected from Scheme 1. Most importantly, however, the intensity of the $H_h$ protons has been also decreased drastically in the A-sol; therefore the acid-catalyzed process engages the para position of the aniline moiety, rendering the present invention chemically and structurally distinct from prior art.

Figure 5:
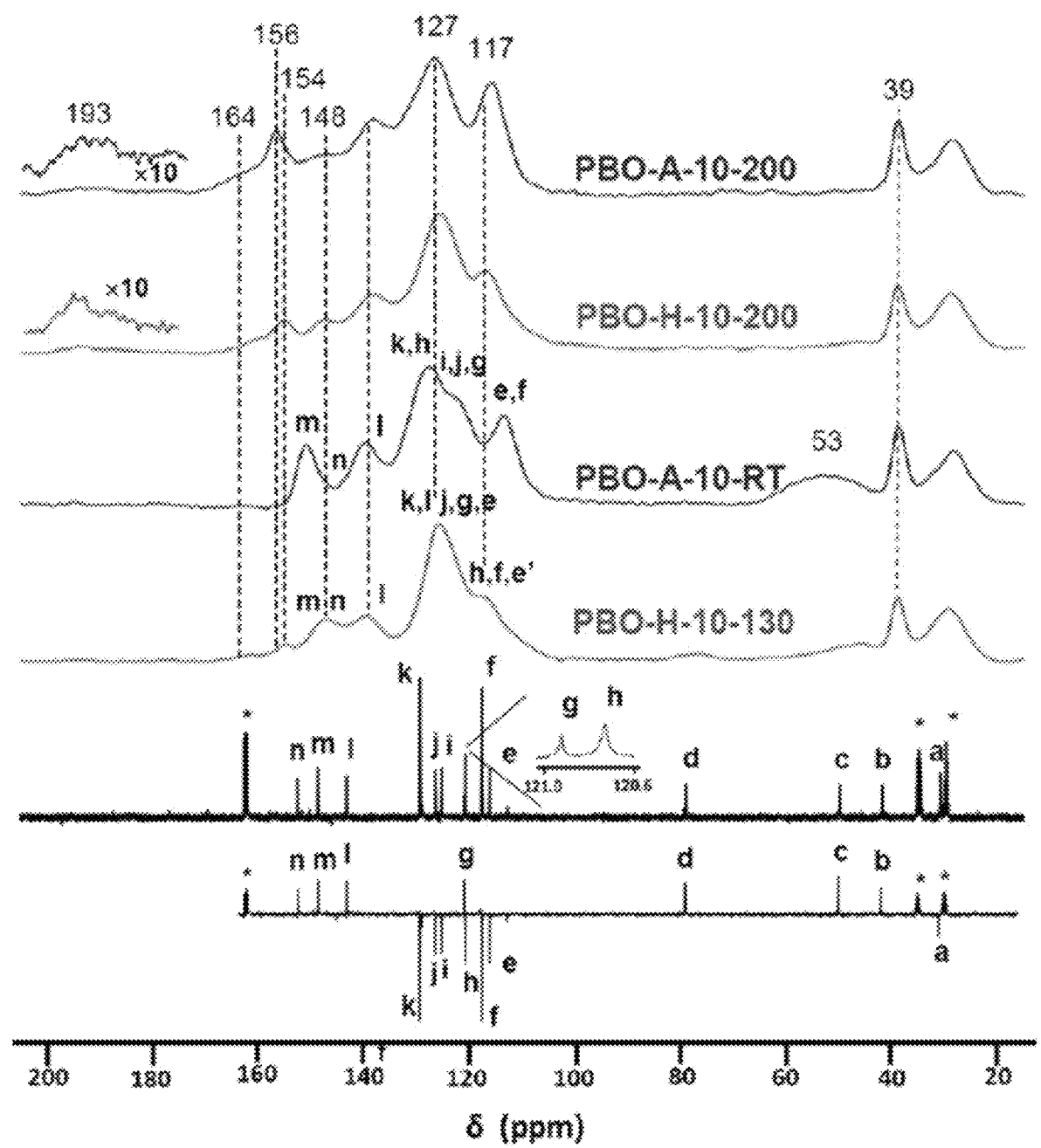
FIG. 5 is a Liquid $^{13}$C NMR spectra of the BO monomer in the APT and the normal mode (bottom, and second from bottom, respectively) in DMF-d$_7$ (marked with asterisks) containing chromium(III) tris-(acetylacetonate). Peak assignments were based on integrated intensity and the APT spectrum. Solid-state CPMAS $^{13}$C NMR spectra of the aerogels samples as shown.

As depicted in FIG. 5, the $^{13}$C NMR spectroscopy confirms the findings of the $^1$H NMR spectroscopy, in that the A-polymers are chemically and structurally distinct from the PBO predicted by prior art, as indicated in Scheme 1. As prepared, PBO-A-xx-RT lack any resonance in the 80 ppm region, indicating that (a) all benzoxazine rings have reacted (i.e., all $C_d$—O bonds have been broken) and (b) the polymer includes no phenoxy bonding arrangements (i.e., no —CH$_2$—O-Ph-). PBO-A-xx-RT also show an atypically broad resonance in the 40-60 ppm region ($C_c$), indicating a multitude of bonding environments for the —N—CH$_2$— carbons, hence the simple polymeric structure of Scheme 1 is no longer valid. Accordingly, the polymer of the present invention is a new structural arrangement in comparison to the prior art.

Figure 6:
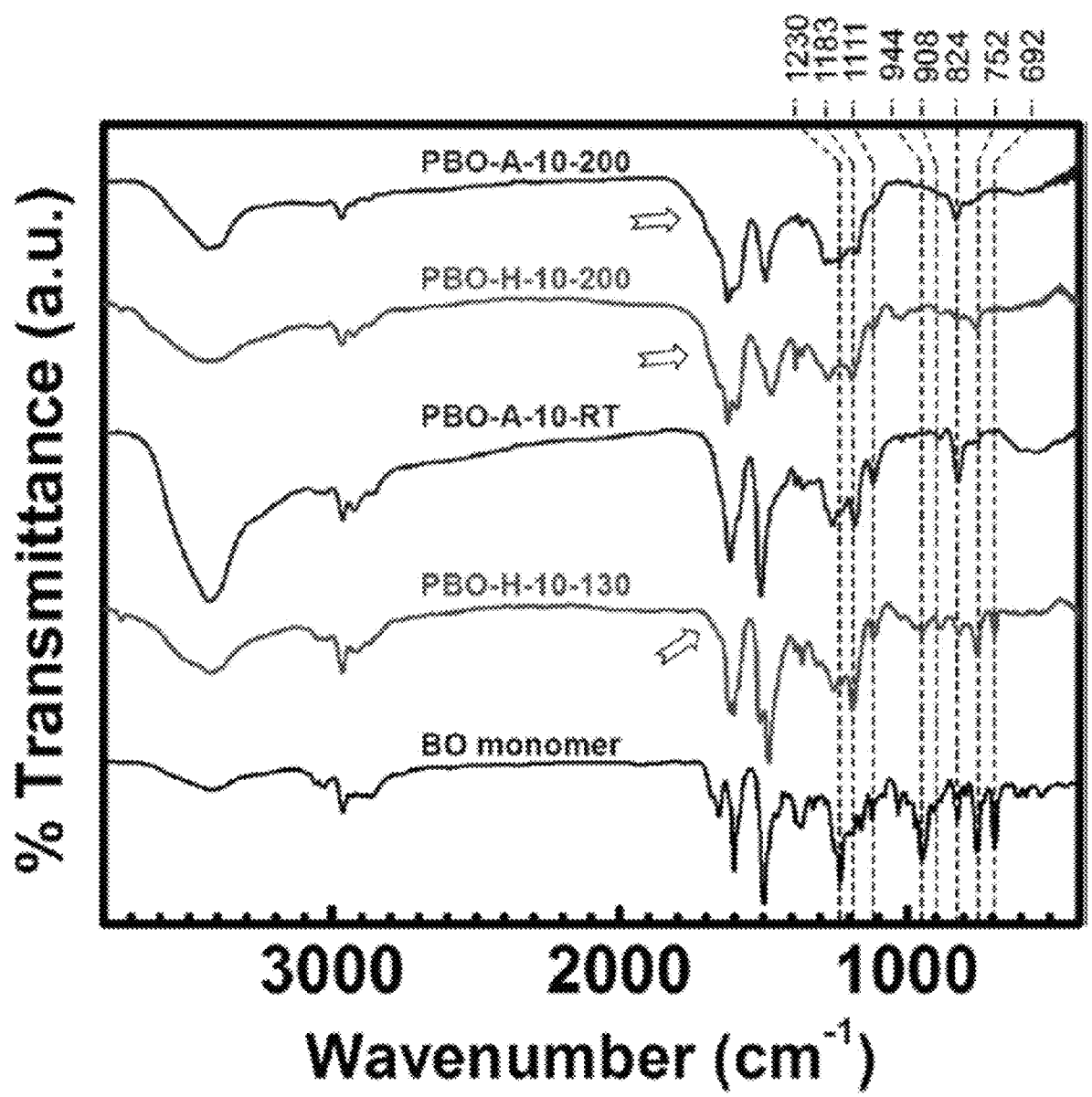
FIG. 6 depicts infrared (FTIR) spectra of the BO monomer and of representative aerogel samples as shown.

Referring now to FIG. 6, the infrared (FTIR) spectra of the aerogels demonstrates that aniline moiety is involved with the polymerization and curing process in both kinds of materials, H- and A-, but by different modes: in the A-process, aniline undergoes early substitution in its para position (during gelation), consistent with the reaction of the $H_h$ protons observed in $^1$H NMR (FIG. 4); in the H-process, aniline also reacts during the polymerization process, but mostly during curing. Most importantly though, reaction of aniline during curing in both H- and A-processes yields products with no clear substitution pattern in the OOP bending region (900-690 cm$^{-1}$), consistent with ring-fusion aromatization. See Scheme 2.

Considering the above together, the structure of PBO-A-xx-RT departs significantly from the conventional polymer structure depicted in Scheme 1, and needs to be modified in order to account for polymerization through para-coupling of aniline. This is reconciled based on the generally accepted mode of the benzoxazine ring-opening into an iminium ion (Scheme 2), which, in a low-activation environment (room temperature), undergoes electrophilic aromatic substitution at the activated para position of the aniline moiety, rather than at the sterically hindred ortho position of bisphenol A. According to $^1$H NMR, the ortho position of phenol (pointed with an arrow in Scheme 2) is also engaged eventually by iminium electrophiles, resulting in a more tightly cross-linked polymer, wherein each repeat unit has six points of attachment versus four in the heat-induced process. PBO-H-xx-130/200 aerogels produced via thermally induced polymerization and curing show no evidence for the para-substituted aniline.

Aerogel's exposure to oxygen (i.e., room air) is an important component of the critical curing step (i.e., at around 200° C.) in that this step oxidizes, aromatizes, and rigidizes the polymeric backbone, regardless of whether the aerogel was produced by the heat-induced or the acid-catalyzed method. There are, however, differences in the chemical structures and the chemical reactions they undergo during the curing step depending on the method of synthesis. Nevertheless, these processes are driven by the red-ox reactions amongst the various moieties within the polymer and are facilitated by the oxygen in the environment. The mechanism for the Oxidative Aromatization of the PBO network for the acid catalyzed aerogels is depicted in Scheme 3. Further, the chemical structures and their elemental analysis data for the post-curing oxidized forms of these polymers is tabulated in Table 2.

Scheme 3: Mechanism for the Oxidative Aromatization of the PBO Network (only half of the Bisphenol A moiety is shown)
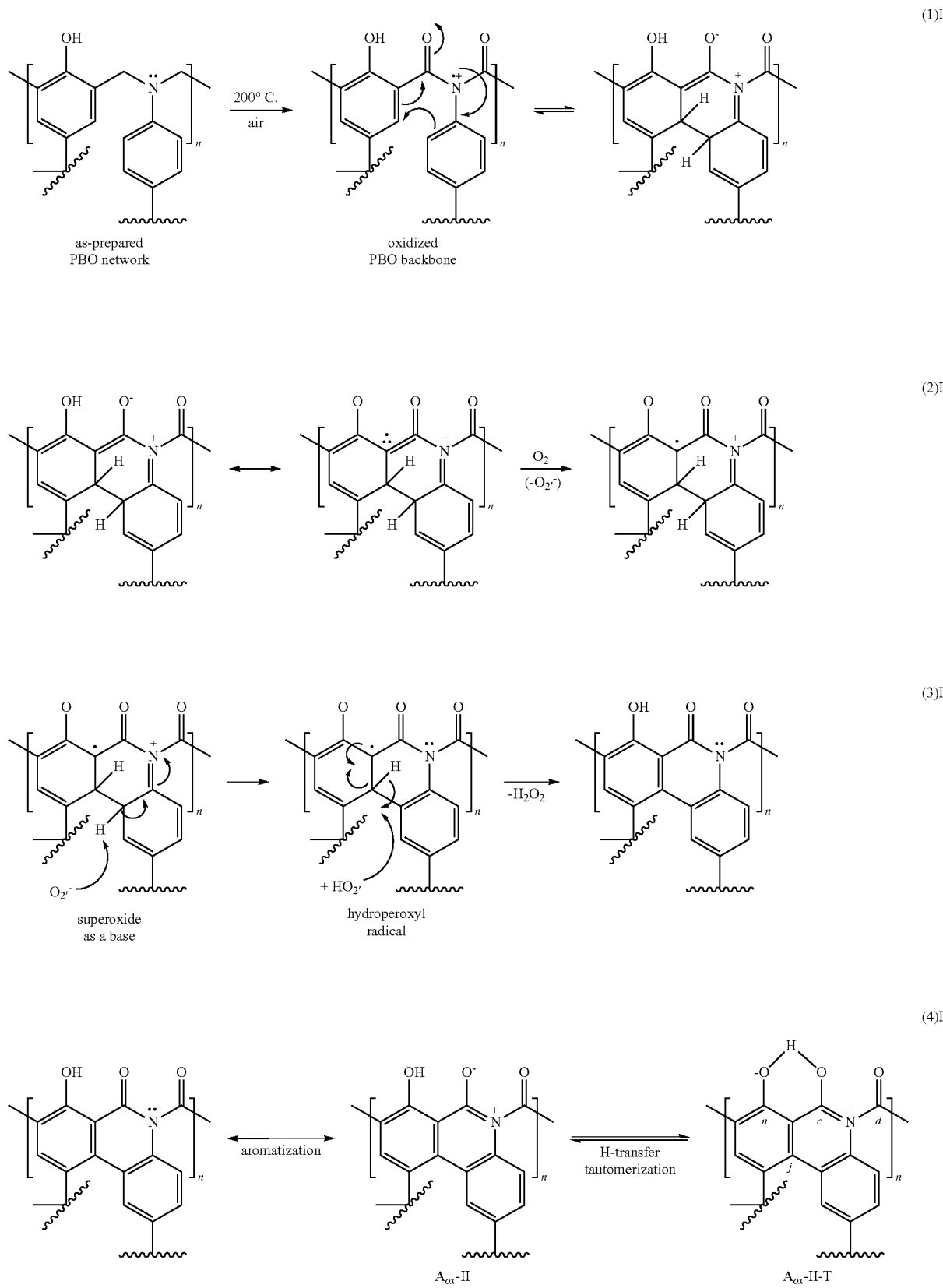

TABLE 2

Tabulation of Selected Oxidized Forms of Polymers and their CHNO Analysis data

| Polymer | % C | % H | % N | % O |
| --- | --- | --- | --- | --- |
| Idealized PBO[a] | 80.5 | 6.54 | 6.10 | 6.92 |
| PBO-H-10-200[b] | 75.75 | 4.39 | 5.52 | 14.34 |
| PBO-H-20-200[b] | 75.12 | 4.84 | 5.06 | 14.98 |
| PBO-A-10-200[b] | 69.40 | 4.36 | 5.60 | 15.52 |
| PBO-A-20-200[b] | 70.86 | 3.78 | 5.60 | 17.67 |
| $H_{ox}$-I | 75.9 | 5.31 | 5.71 | 13.1 |
| $H_{ox}$-II | 76.5 | 4.53 | 5.76 | 13.2 |
| $A_{ox}$-I | 72.1 | 3.87 | 5.43 | 18.6 |
| $A_{ox}$-II | 72.7 | 3.13 | 5.47 | 18.8 |

Prone to oxidation are the —$CH_2$— groups along the polymer backbone (structures $H_{ox}$-I and $A_{ox}$-I), consistent with the reduction-in-size and/or disappearance of the bridging —$CH_2$—'s from the solid-state $^{13}C$ NMR spectra. Additional oxidation is driven by aromatization and results in ring fusion as outlined in Scheme 3 (see Table 2, structures Hox-II and Aox-II). Aromatization accounts for the fixation of nitrogen into a rigid polymeric backbone, which is almost a prerequisite for nitrogen to survive pyrolysis at 800° C. The calculated CHNO weight percents of structures Hox-I and Hox-II are closer to the experimental data from PBO-H-xx-200, albeit $^{13}C$ NMR, which indicates no residual —$CH_2$— carbons. Similarly, the calculated CHNO values for $A_{ox}$-I and $A_{ox}$-II match closer with the experimental ones from PBO-A-xx-200 (note in particular the high percent level of oxygen). Furthermore, as described by equation 4 of Scheme 3, phenolic —OH is expected to be more acidic than $^+N$=C—OH (phenolic —O— is delocalized through the phenyl ring, while the $^+N$=C—O$^-$↔N—C=O resonance destroys aromaticity); therefore, inventors expect proton-transfer tautomerization through the six-membered ring transition state, as shown. The simulated $^{13}C$ NMR spectrum of tautomer Aox-II-T (Scheme 3, equation 4) shows resonances for the $C_n/C_e/C_j$ carbons at 165/158/148 ppm, respectively, that is very close to the downfield pattern observed experimentally (164/156/148 ppm, FIG. 5). In addition, the carbonyl carbon $C_d$ is expected roughly at 200 ppm, again close to the experimentally observed broad resonance at 193 ppm (common to both A- and H-cured samples—FIG. 5).

Referring now to Table 3, all −200 samples shrunk significantly relative to their molds, and the shrinkage is extremely reproducible. Overall, in both A- and H-aerogels, shrinkage first increases with the concentration of the BO monomer, reaching a maximum at -xx-~15-20, and then decreases. A-aerogels shrink slightly more (up to 37% in linear dimensions) than their H-counterparts (up to 33%), and increased shrinkage of the A-aerogels may be attributed to the tighter molecular structure of the former, due to the higher degree of cross-linking observed in the A-aerogels.

TABLE 3

Properties of PBO-A-xx-200 and PBO-H-xx-200 Polybenzoxazine Aerogels

| Sample [a] | Linear shrinkage [%] [b, c] | Bulk density $\rho_b$ [g cm$^{-3}$] [b] | Skeletal density $\rho_s$ [g cm$^{-3}$] [d] | Porosity $\Pi$ [% v/v] | BET Surface area, $\sigma$ [m$^2$ g$^{-1}$] | Pore volume (cm$^3$ g$^{-1}$) | | Average pore diameter [nm] via 4 V/$\sigma$ | | | particle diameter [nm] [h] |
|---|---|---|---|---|---|---|---|---|---|---|---|
| | | | | | | $V_{Total}$ [e] | $V_{1.7-300\_nm}$ [f] | V: single max point adsorption | V = $V_{Total}$ | from Hg-intrusion [g] | |
| PBO-A-5-200 * | 26.24 ± 0.20 | 0.109 ± 0.006 | 1.314 ± 0.007 | 91.7 | 72.2 | 8.41 | 0.18 | 11 | 466 | 393 | 64 (95.4) |
| PBO-A-7-200 ** | 30.85 ± 0.21 | 0.224 ± 0.018 | 1.305 ± 0.005 | 82.8 | 60.7 | 3.69 | 0.15 | 11 | 244 | 185 | 76 (91.8) |
| PBO-A-10-200 | 36.17 ± 0.60 | 0.373 ± 0.019 | 1.320 ± 0.006 | 71.7 | 65.6 | 1.92 | 0.19 | 13 | 117 | 90 | 70 (82.0) |
| PBO-A-12-200 *** | 34.43 ± 0.05 | 0.483 ± 0.051 | 1.321 ± 0.004 | 63.4 | 60.1 | 1.31 | 0.19 | 13 | 87 | 80 | 76 (58.8) |
| PBO-A-15-200 | 35.46 ± 0.05 | 0.560 ± 0.024 | 1.319 ± 0.002 | 57.5 | 69.8 | 1.03 | 0.39 | 23 | 59 | 41 | 65 (64.4) |
| PBO-A-20-200 **** | 32.15 ± 0.17 | 0.670 ± 0.030 | 1.333 ± 0.002 | 49.7 | 64.6 | 0.74 | 0.37 | 23 | 46 | 46 | 70 (52.0) |
| PBO-H-5-200 | 28.84 ± 1.16 | 0.075 ± 0.013 | 1.317 ± 0.007 | 94.3 | 63.9 | 12.57 | 0.15 | 11 | 787 | 748 | 70 (117) |
| PBO-H-10-200 * | 23.39 ± 0.49 | 0.112 ± 0.015 | 1.261 ± 0.005 | 91.1 | 46.9 | 8.13 | 0.15 | 13 | 694 | 606 | 102 (112) |
| PBO-H-15-200 ** | 28.38 ± 0.66 | 0.232 ± 0.021 | 1.275 ± 0.004 | 81.8 | 32.8 | 3.52 | 0.09 | 12 | 430 | 399 | 144 (105) |
| PBO-H-20-200 *** | 33.11 ± 1.68 | 0.447 ± 0.072 | 1.278 ± 0.005 | 65.0 | 25.5 | 1.45 | 0.04 | 13 | 227 | 146 | 184 (92.0) |
| PBO-H-30-200 **** | 29.60 ± 0.80 | 0.670 ± 0.051 | 1.245 ± 0.005 | 46.1 | 23.7 | 0.69 | 0.08 | 15 | 116 | 84 | 204 (83.8) |
| PBO-H-40-200 | 22.87 ± 0.75 | 0.732 ± 0.020 | 1.208 ± 0.002 | 39.4 | 20.3 | 0.59 | 0.06 | 13 | 106 | 63 | 244 (95.6) |

[a] Asterisks match samples of approximately equal bulk densities.
[b] Average of 10 samples.
[c] Shrinkage = 100 × (mold diameter − sample diameter)/(mold diameter).
[d] Single sample, average of 50 measurements.
[e] Via $V_{Total} = (1/\rho_b) - (1/\rho_s)$.
[f] BJH-desorption cumulative pore volume.
[g] From the log(differential intrusion) versus pore diameter plot.
[h] Via d = $6/\rho_1\sigma_1$ for the number in parentheses, the diameter was calculated from SAXS data.

Bulk densities, $\rho_b$, increase monotonically, albeit not linearly, with the BO monomer concentration in the sol. Importantly, it is also noted that at the same BO monomer concentrations in the sol (i.e., same -xx- in the sample names), heat-polymerized H-aerogels are significantly less dense (30-50%) than their A-counterparts. The differential shrinkage may partly explain that effect; however, the main contributing factor is a significant mass loss in the H-samples during post-aging washing. Mass balance based on the relative weight of the BO monomer and of the resulting PBO-H-xx-200 shows only a 60±1% w/w mass recovery for 5≤-xx-≤20, versus a 92-95% for the corresponding acid-catalyzed PBO-A-xx-200 samples. Clearly, the acid-catalyzed room temperature gelation process of the present invention is not only shorter but also more mass-efficient.

Further, the skeletal densities, $\rho_s$, of PBO-A-xx-200 aerogels are invariant of -xx-. On the other hand, except PBO-H-5-200, the skeletal densities of all other PBO-H-xx-200 (10≤-xx-≤40) are markedly lower than those of the PBO-A-xx-200 aerogels and decrease as the bulk density increases. Such behavior has been observed in other systems before and has been attributed to closed pores on the skeletal framework. The percent volume fraction of the closed pores on the skeletal framework, VCP, can be calculated via VCP=100×($\rho_{PBO}-\rho_s$)/$\rho_{PBO}$, whereas $\rho_{PBO}$ is the intrinsic density of the PBO polymer. Taking the highest skeletal density, that of PBO-H-5-200 ($\rho_s$=1.317 g cm$^{-3}$, see Table 3), as equal to $\rho_{PBO}$, it is calculated that VCP varies from 3.0% to 8.3% v/v. The closed porosity of the skeletal framework is not included in calculations of the open porosity, $\Pi$, via $\Pi$=100×($\rho_s-\rho_b$)/$\rho_s$. In that regard, the $\Pi$ values of density-matched A- and H-aerogels are extremely close to one another (Table 3).

Figure 7:
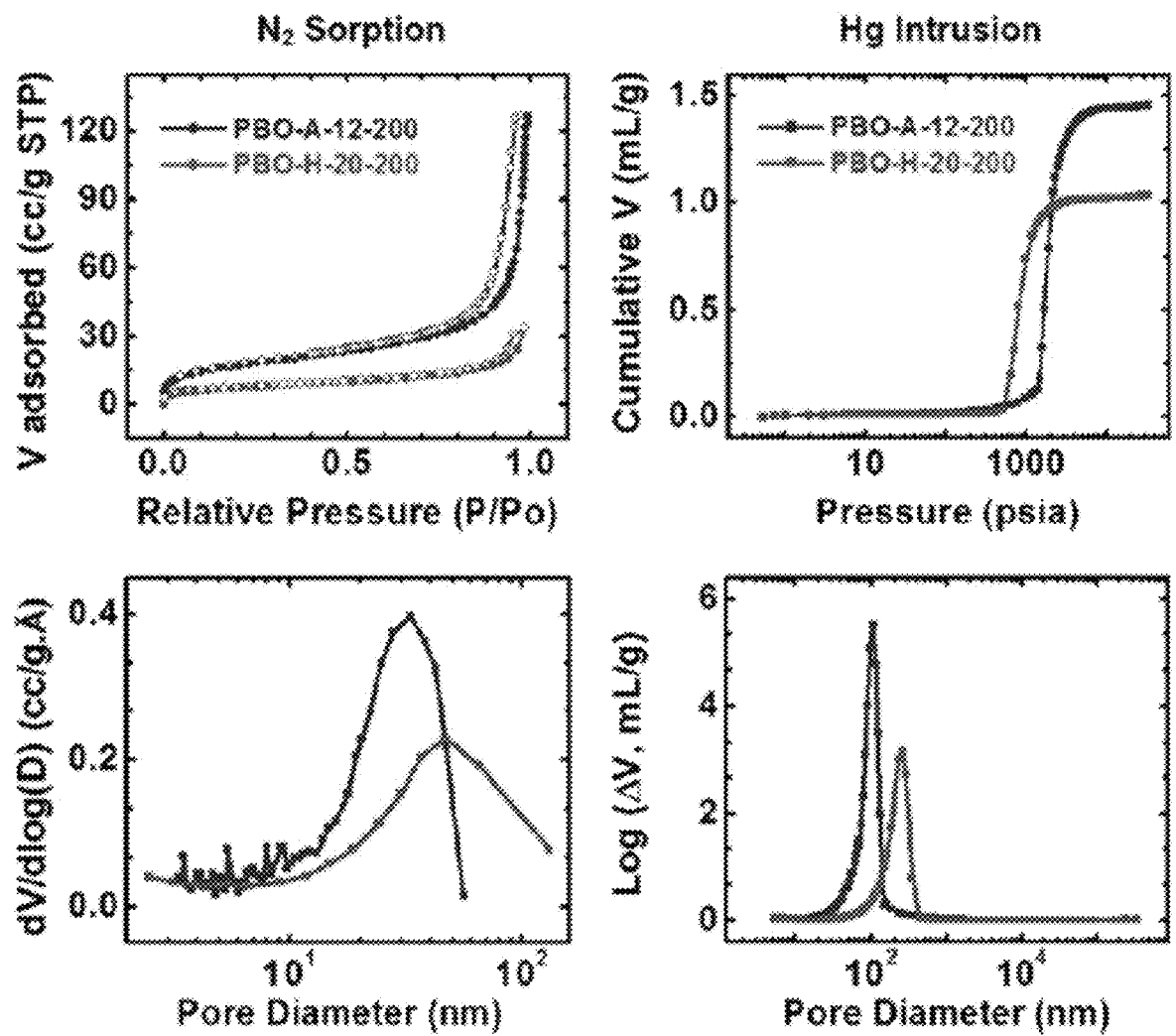
FIG. 7 is a set of graphs depicting representative porosimetry (top) and pore size distribution data of cured (200° C./air), density-matched A- and H-PBO samples as shown (PBO-A-12-200, $\rho_b$=0.483 g cm$^{-3}$; PBO-H-20-200, $\rho_b$=0.447 g cm$^{-3}$). The left panels contain N$_2$ sorption data, and the right panels depict Hg-intrusion data.

As depicted in FIG. 7, the graphs reflect data about the porous structure, as investigated with N$_2$-sorption and Hg intrusion porosimetry. N$_2$-sorption isotherms show no signs of microporosity, generally rising above P/P$_o$=0.8-0.9, thus pointing to mostly macroporous materials. By the same token, A-aerogels show narrow hysteresis loops that become wider and reach short saturation plateaus as the bulk density increases, signifying increasing mesoporosity. Similar signs of mesoporosity are shown only by higher-density H- aerogels (e.g., PBO-H-20-200, see FIG. 6), yet the volume of N$_2$ adsorbed by H-aerogels is throughout much lower than that adsorbed by A-aerogels. Surface areas, $\sigma$, via the Brunauer-Emmett-Teller (BET) method are about double or higher in the PBO-A-xx-200 materials than their $\rho_b$-matched PBO-H-xx-200 counterparts.

An independent evaluation of the average pore sizes using Hg intrusion porosimetry yields values that generally match well with the pore sizes calculated via the $4 \times V_{Total}/\sigma$ method, see Table 3. Overall, both A- and H-aerogels include meso- and macro-pores. The former have higher volumes attributed to pore sizes below 300 nm than the latter. Within those two size regimes (i.e., above and below 300 nm), both macropore and mesopore size distributions of A-aerogels, the present invention, as a group are shifted to lower diameters than their H-counterparts, in the prior art.

Figure 8:
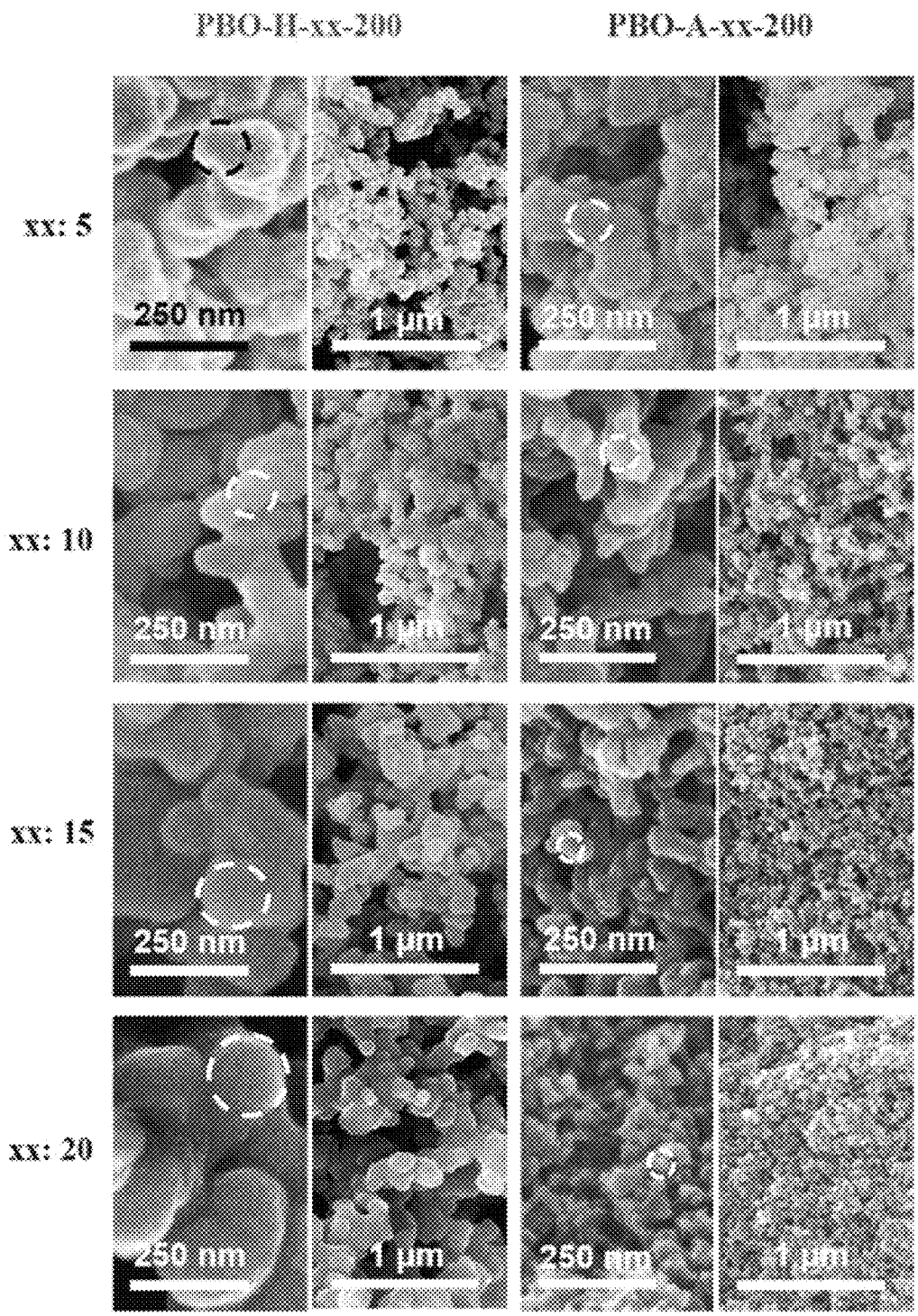
FIG. 8 is a set of SEM at two different magnifications of heat- and acid-polymerized PBO aerogels at different sol concentrations (-xx-) as shown. Dashed circles indicate the smallest particle identifiable.

With reference to FIG. 8, scanning electron microscope (SEM) images from two different magnifications for all 5≤-xx-≤20 samples are compared therein. No particular organization of the particles is noticeable at any lengthy scale. Instead, the particles simply aggregate into larger, apparently random clusters for both the A- and H-aerogels. An important observation, however, is that the apparent particle size in PBO-H-xx-200 increases with density (i.e., as-xx-moves from 5-20), while in PBO-A-xx-200 the trend is exactly the opposite. (The smallest identifiable particles in FIG. 8 are denoted with dashed circles for quick reference.) The same trends are obtained from particle size calculations using skeletal density and gas sorption data (via particle diameter, $d=6/\rho_s\sigma$, see Table 3). Thus, this structural difference as to the skeletal framework and interparticle connectivity distinguishes the present invention (A-) from prior art (H-).

Figure 9:
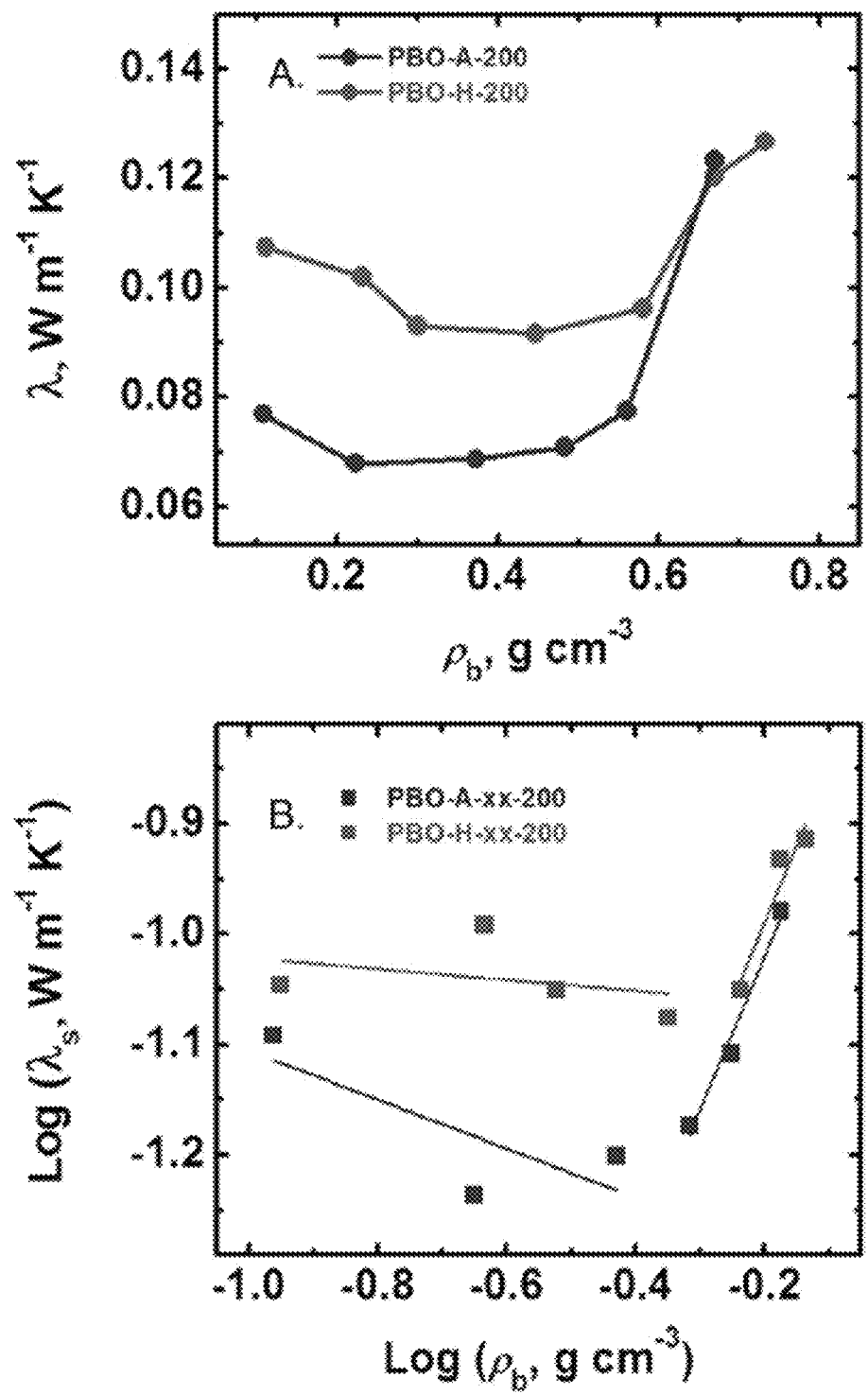
FIG. 9 is a set of graphs depicting (A) total thermal conductivity data ($\lambda$) as a function of bulk density ($\rho_b$) of PBO aerogels. (B) Log-log plot of the thermal conductivity through the solid framework ($\lambda_s$) versus bulk density of PBO aerogels as shown.

As depicted in FIG. 9, at all $\rho_b$, A-aerogels are much better thermal insulators than their H-counterparts, a fact attributed intuitively to their smaller pore and particle sizes linking, become responsible for efficient use of the monomer, for smaller more numerous particles, and therefore for finer structures with mesoporosity and higher surface areas.

Figure 10:
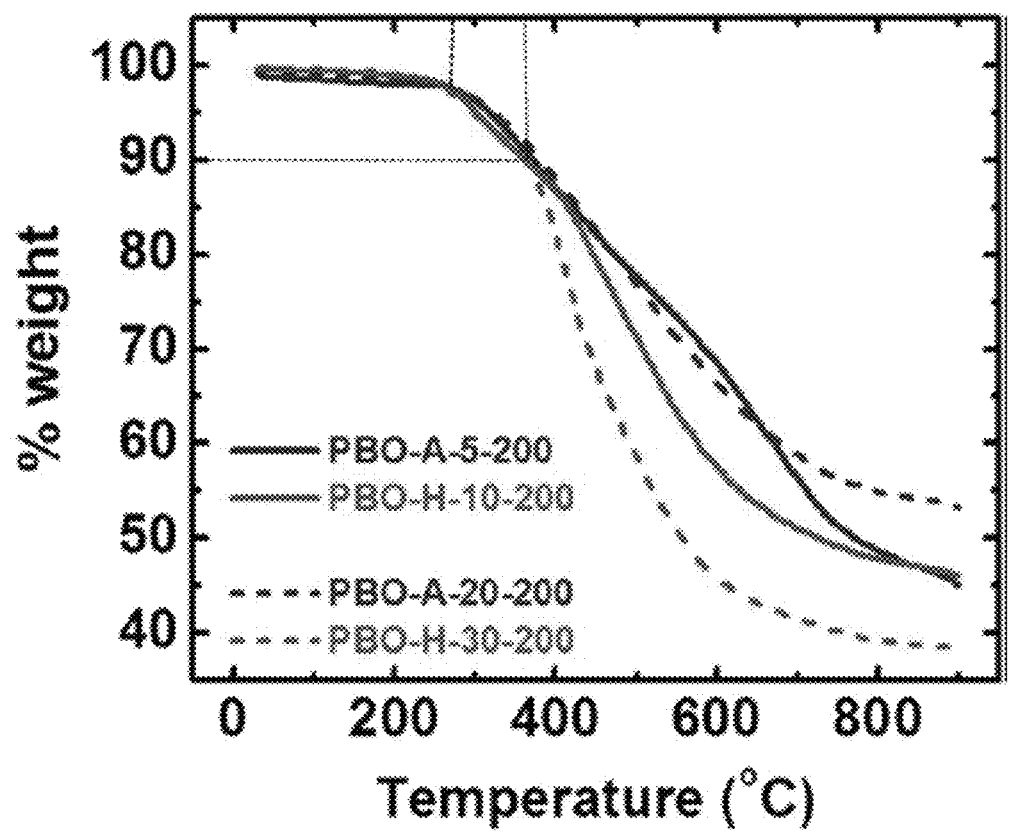
FIG. 10 is a graph of thermogravimetric analysis (5° C. min$^{-1}$) under high purity nitrogen of bulk density-matched PBO aerogels samples as shown.

As depicted in FIG. 10, all PBO-A- (or H-) xx-200 aerogels are equally resistant to heat, starting to lose mass at around 270° C. The 10% mass-loss point is also common for all materials, at around 350° C. Heated up to 900° C., both kinds of aerogels leave significant amounts of residue.

Figure 11:
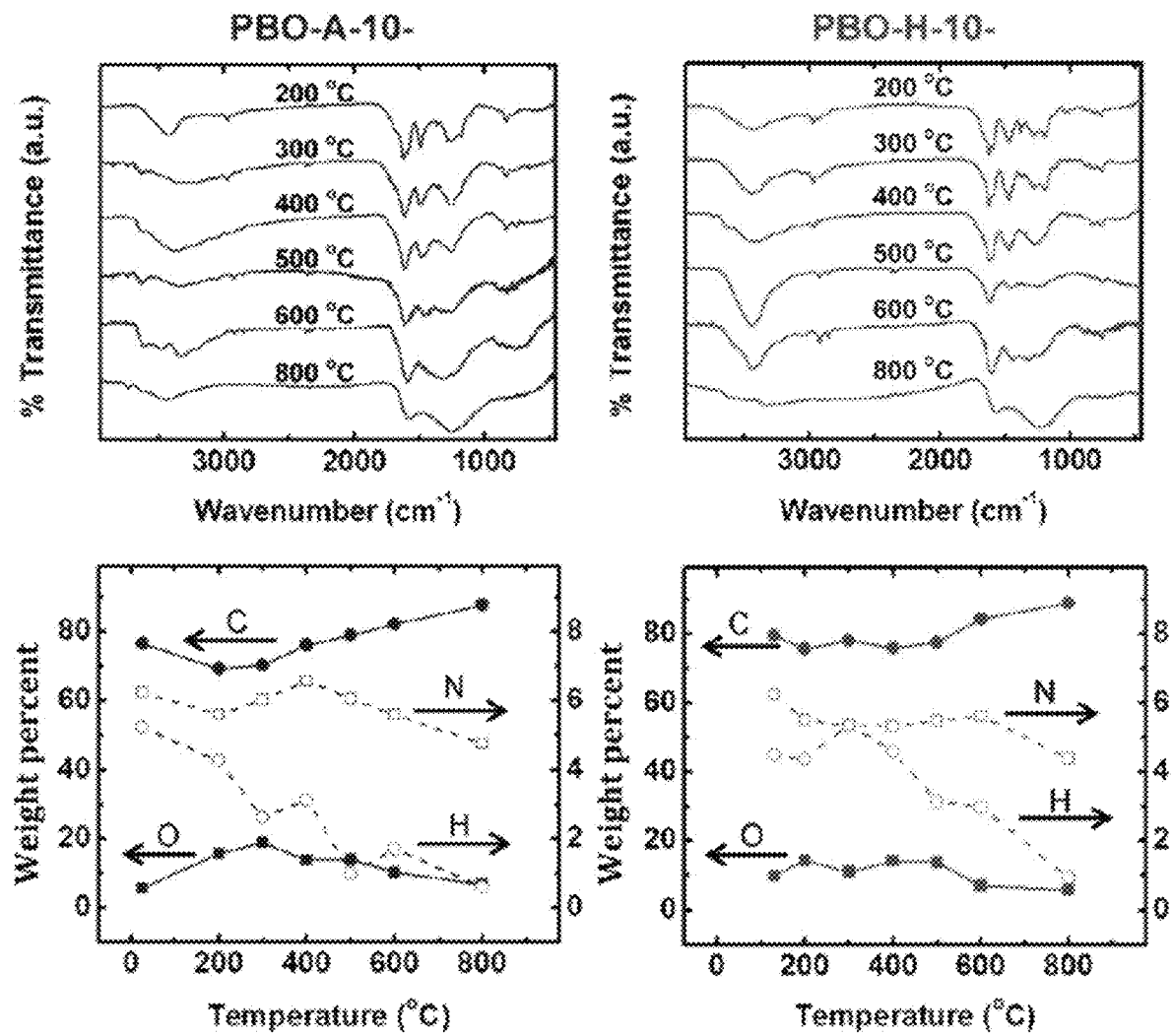
FIG. 11 is a set of graphs depicting elemental analysis data and evolution of IR spectra of PBO aerogels at progressively higher pyrolysis temperatures (5 h under high-purity Ar)

As depicted in FIG. 11, it is necessary to carry out pyrolysis at over 600° C., in order to remove the C—H and O—H stretching absorptions (albeit the latter not completely). Carbonization yields, when pyrolysis is conducted under flowing Ar at 800° C., are somewhat higher for C-A-xx-800 (56-61% w/w) than for C-H-xx-800 samples (50-55% w/w), as detailed in Table 4. The persistence of N and of H-bonded O (up to at least 600° C.) (see FTIR spectra in FIG. 6) is consistent with oxidative curing and aromatized structures Aox-II and $H_{ox}$-II.

TABLE 4

Properties of Nanoporous Carbons Derived from PBO-A-(H—)xx-200 Aerogels

| Sample [a] | Carbonization yield [% w/w] [b] | Linear Shrinkage [%] [b, c] | Bulk density $\rho_b$ [g cm$^{-3}$] [b] | Skeletal density $\rho_s$ [g cm$^{-3}$] [d] | Porosity Π [% v/v] | BET Surface area, σ (micropore area) [m$^2$ g$^{-1}$] |
|---|---|---|---|---|---|---|
| C-A-5-800 * | 58 ± 1 | 20.0 ± 0.2 (41) | 0.126 ± 0.012 | 1.894 ± 0.043 | 93 | 516 (427) |
| C-A-10-800 ** | 58 ± 1 | 25.6 ± 0.5 (53) | 0.469 ± 0.013 | 1.806 ± 0.019 | 74 | 510 (422) |
| C-A-15-800 | 56 ± 2 | 20.9 ± 0.3 (49) | 0.724 ± 0.032 | 1.902 ± 0.005 | 62 | 524 (431) |
| C-A-20-800 | 61 ± 3 | 20.8 ± 0.2 (46) | 0.886 ± 0.025 | 1.870 ± 0.003 | 53 | 348 (258) |
| C—H-5-800 | 53 ± 3 | 16.3 ± 0.5 (40) | 0.090 ± 0.015 | 1.655 ± 0.055 | 94 | 61 (7) |
| C—H-10-800 * | 50 ± 3 | 21.6 ± 0.4 (40) | 0.127 ± 0.019 | 1.799 ± 0.034 | 93 | 190 (132) |
| C—H-15-800 | 54 ± 3 | 28.3 ± 0.8 (49) | 0.227 ± 0.008 | 1.863 ± 0.050 | 88 | 347 (265) |
| C—H-20-800 ** | 55 + 3 | 28.8 ± 0.4 (52) | 0.450 ± 0.083 | 1.790 ± 0.014 | 75 | 372 (301) |

| Sample [a] | Pore volume (cm$^3$ g$^{-1}$) | | | Mesopore diameter [nm] [h] | Micropore diameter [Å] [i] |
|---|---|---|---|---|---|
| | $V_{Total}$ [e] | $V_{1.7-300\_nm}$ [f] | $V_{micropore}$ [g] | | |
| C-A-5-800 * | 7.40 | 0.11 | 0.17 | 24.1 (14.2) | 5.622 |
| C-A-10-800 ** | 1.58 | 0.19 | 0.13 | 34.9 (32.6) | 5.728 |
| C-A-15-800 | 0.85 | 0.54 | 0.11 | 39.0 (26.4) | 5.570 |
| C-A-20-800 | 0.59 | 0.36 | 0.14 | 26.0 (19.0) | 5.943 |
| C—H-5-800 | 10.50 | 0.14 | 0.01 | 65.3 (44.2) | 7.698 |
| C—H-10-800 * | 7.31 | 0.20 | 0.16 | 64.4 (43.7) | 5.467 |
| C—H-15-800 | 3.86 | 0.25 | 0.09 | 59.9 (77.3) | 5.740 |
| C—H-20-800 ** | 1.66 | 0.06 | 0.15 | 21.1 (24.1) | 5.610 |

[a] Asterisks match samples of approximately equal bulk densities.
[b] Average of 5 samples.
[c] Shrinkage relative to parent PBO aerogels = 100 × [1 − (C-sample diameter/PBO-sample diameter)]. Values in (parentheses): total shrinkage relative to the original molds.
[d] Single sample, average of 50 measurements.
[e] Via $V_{Total} = (1/\rho_b) - (1/\rho_s)$].
[f] BJH-desorption cumulative pore volume.
[g] Cumulative volume of N$_2$ adsorbed at P/P$_o$ ≤ 0.1 using a low-pressure N$_2$ dosing routine.
[h] Maxima of BJH-desorption plots. Values in (parentheses): widths at half maxima (nm).
[i] Median pore width obtained with the Horvath-Kawazoe method applied to N$_2$-sorption data under low-pressure dosing.

that both contribute toward higher thermal resistance. The morphostructural variation between H- and A-aerogels can be reconciled based on the molecular structures of the H- and A-polymers. Clearly, the acid-catalyzed (present invention) reaction is much faster and more efficient, consuming quickly all the BO monomer, with a material recovery for A-aerogels being >90% w/w. More cross-linked, hence, more insoluble A-polymer phase-separates earlier than H-polymer into smaller particles. The accelerated rate of the acid-catalyzed reaction (as embodied by the present invention), together with the additional possibilities for cross- In terms of materials' properties, C-A- (or H-)xx-800 shrink an additional 20-29% relative to their parent PBO aerogels (e.g., see FIG. 3), to a total shrinkage of 40-53% from the molds (Table 4). A combination of factors (parent aerogel density, shrinkage, mass loss during pyrolysis) work synergistically to yield more dense C-A-aerogels (0.13-0.90 g cm$^{-3}$) than their C-H-counterparts (0.09-0.45 g cm$^{-3}$). Skeletal densities, $\rho_s$, of C-A-xx-800 aerogels are also somewhat higher (1.81-1.90 g cm$^{-3}$) than those of the C-H-xx-800 aerogels (1.66-1.86 g cm$^{-3}$), but all values are either within or close to the range expected for amorphous carbon (1.8-2.0 g cm$^{-3}$). Unlike Porosities, Π values of $\rho_b$-matched C-A-xx-800 and C-H-xx-800 samples (indicated with asterisks in Table 4) are practically identical, because unlike the parent PBO-H-xx-200, skeletal densities of C-H-xx-800 no longer show a dependence on Pp, signifying the absence of closed porosity.

Figure 12:
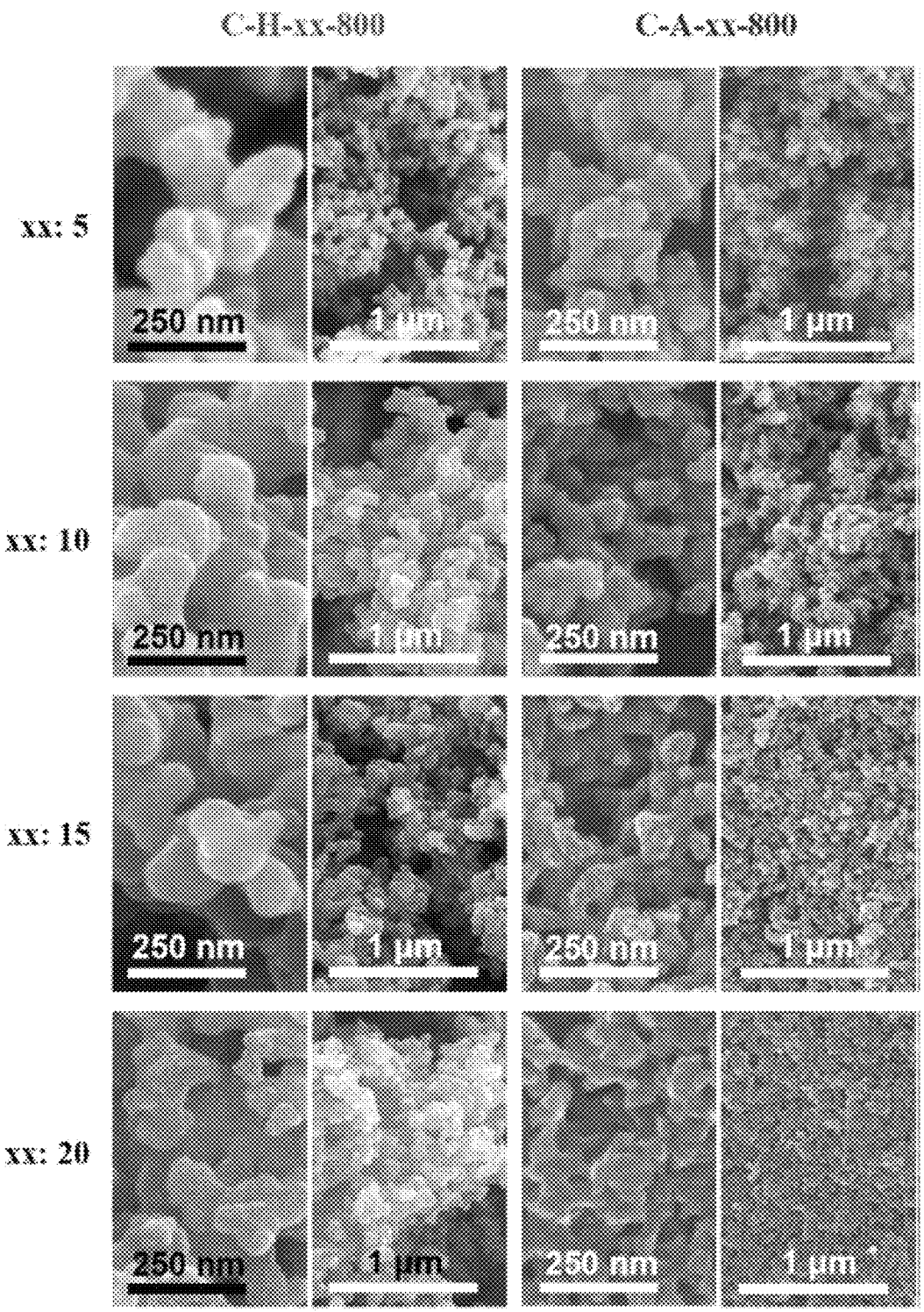
FIG. 12 is a set of SEM at two different magnifications of carbon aerogels originating from heat- and acid-polymerized PBO aerogels at different sol concentrations (-xx-) as shown.

As depicted in FIG. 12, the microscopic skeletal framework of carbon aerogels appears to qualitatively follow the trends set by the parent PBOs (compare with FIG. 7), wherein larger particles in the parent PBOs seem to result in larger particles in the carbons. However, overall there is a sense that particles have undergone a surface melting-like fusion (sintering), which is evident in both higher-density C-H-20-800 and C-A-20-800 aerogels.

Figure 13:
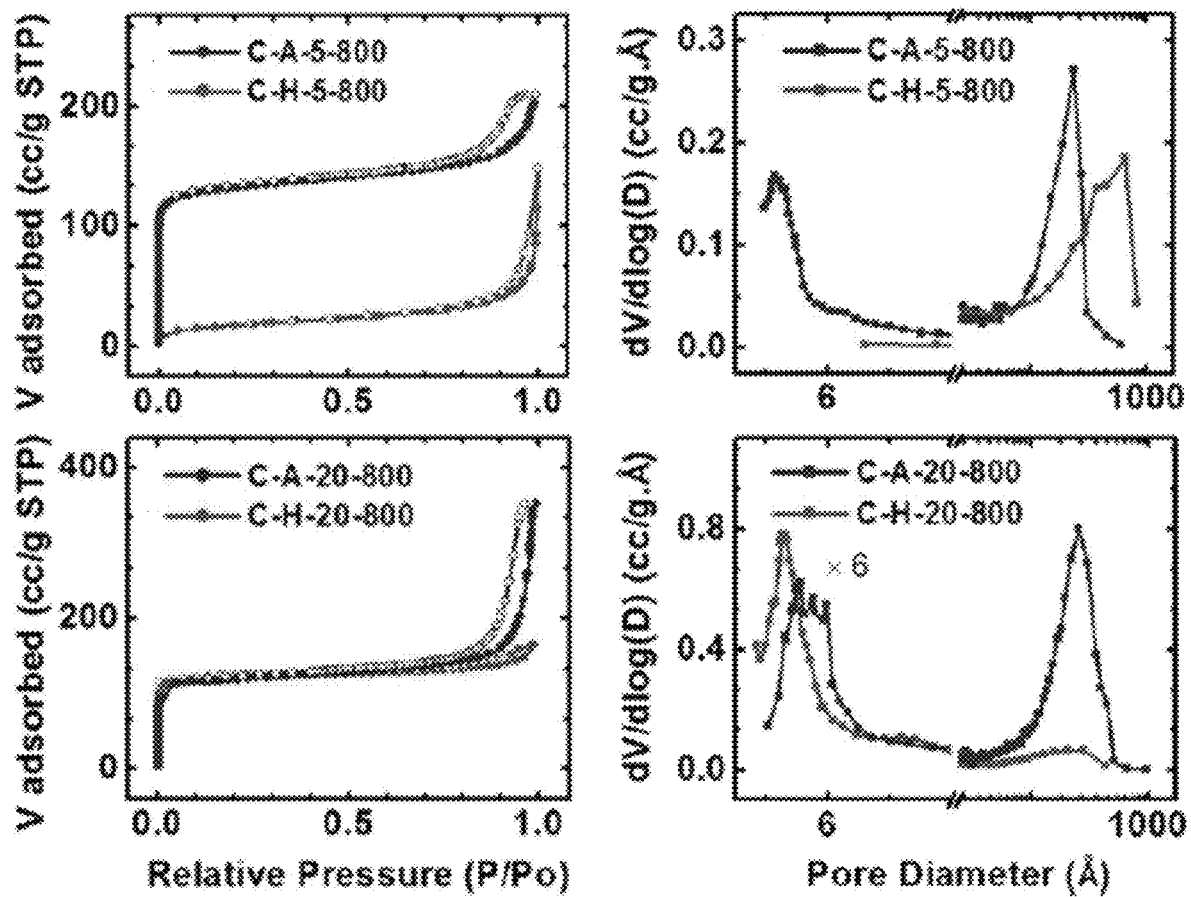
FIG. 13 is a set of graphs depicting N$_2$-sorption porosimetry of C-aerogels originating from low-concentration sols (top, -xx-=5) and high-concentration sols (bottom, -xx-=20).

As depicted in FIG. 13, C-H-aerogels adsorb much less $N_2$ than C-A-aerogels, at high relative pressures (P/Po~1), a property inherited from the parent PBO-H- and PBO-A-aerogels. Likewise, the isotherms of C-A-xx-800 reach narrow saturation plateaus and show hysteresis loops at all densities, signifying mesoporosity. In contrast, the isotherms of the C-H-aerogels show that those are mostly macroporous materials at all densities. Pore size distributions by the BJH method (shown in FIG. 13) support those conclusions.

On the other hand, at low relative pressures, all C-A-xx-800 aerogels of the present invention show a rapid rise of the volume of $N_2$ adsorbed at P/Po<<0.1, indicating microporosity (pore sizes <2 nm). This is confirmed by pore size distribution analysis using the Horvath-Kawazoe method on $N_2$-sorption data under low-pressure dosing and assuming cylindrical pore geometry (FIG. 13). (It is noted that oftentimes the best fit yields multiple, closely spaced pore sizes—case of C-A-20-800). (Average pore diameter data for meso- and micropores are included in Table 4.) Surface area analysis with the BET method followed by t-plot analysis with the Harkins and Jura method shows that 74-82% of the greatly increased total surface area of all C-A-aerogels relative to their parent PBOs is attributed to the micropores (Table 4). In fact, the remaining BET surface areas are very similar to the BET surface areas of the parent PBO-A-aerogels (for example, consider C-A-5-800 (Table 4); σ=516 m$^2$ g$^{-1}$; micropore area=427 m$^2$ g$^{-1}$; therefore, meso+macropore area=89 m$^2$ g$^{-1}$; meanwhile for PBO-A-5-200 (Table 3), σ=72.2 m$^2$ g$^{-1}$). Similar observations are made for all C-H-xx-800 when -xx->5 (the C-H-5-800 isotherm does not indicate microporosity). Again, for -xx->5, 69-81% of the BET surface area is assigned to micropores, and the remainders are very close to the BET surface areas of the parent PBO-H-aerogels. Overall, it can be concluded that carbonization leaves the mesopore surface area almost intact and creates new surface area within micropores.

A quantitative evaluation of the relative contribution of the various pore sizes in the total porosity comes from a detailed pore volume analysis. Results are included in Table 4. All low-density samples (-xx-=5) are mostly macroporous, as only a very small fraction (1.4-4.0%) of the total pore volume ($V_{Total}$) is associated with pore sizes less than 300 nm. As the bulk density increases, carbons from the present acid-catalyzed PBOs (namely, C-A-15-800 and C-A-20-800) become mostly meso/microporous, whereas 75-85% of $V_{Total}$ is allocated to pores with sizes less than 300 nm. For those samples, the pore volume of less-than-300 nm pores is allocated more to meso- than to micropores (in a 2.5-5 ratio); however, it is emphasized that the micropore surface area always far exceeds the mesopore area, as discussed above. Using the same criteria, C-H-xx-800 samples remain macroporous even at higher densities (refer to C-H-15-800 and C-H-20-800): the pore volume assigned to pore sizes less than 300 nm is always less than 10% of $V_{Total}$. The case of C-H-20-800 is noteworthy as the micropore volume exceeds that of the mesopores (0.15 versus 0.06 cm$^3$ g$^{-1}$, respectively).

A further embodiment of the present invention are the robust, monolithic, and nanoporous metallic aerogels that are synthesized using a methodology described by the present invention. Specifically, FIG. 14 depicts a non-limiting example of an outline of the steps in the overall synthesis of pure metal aerogels, as exemplified by the synthesis of an elemental metallic iron (Fe(0)) aerogel in this flow diagram. Though the details discussed herein are made with reference to synthesis and characterization of metallic iron aerogels, they apply equally to other metallic aerogels. Use of a hydrated metal salts with epoxide (e.g., epichlorohydrine) generates a metal oxide network (i.e., FeOx). Further, deprotonation of the hydrated metal salt, such as the fairly strong Brønsted acid $FeCl_3 \cdot 6H_2O$ synchronously catalyzes ring-opening polymerization of the BO monomer prepared from condensation of bisphenol A, formaldehyde and aniline.

Determining the amount of chemical substrates needed for the optimal production of the metal aerogel requires consideration of multiple factors. For instance, for preparing an Iron (Fe) aerogel, the factors to consider include: (a) the carbonization yield of PBO (~60% w/w); (b) the stoichiometric need of the smelting process ($2Fe_2O_3+3C\rightarrow4Fe+3CO_2$) for a C:Fe atomic ratio of 3:4 (see Scheme 4); and, (c) the possible leaching of loose BO oligomers out of the wet-gels during solvent exchanges, the ($FeCl_3 \cdot 6H_2O$):(BO monomer) ratio was set at about 3.9 mol:mol. The expected atomic ratio of C:Fe available for reduction was about 5.9. Co-gelation of the $FeCl_3 \cdot 6H_2O$/BO-monomer sol was carried out at 80° C. The resulting gels were aged, solvent-exchanged to acetone, and dried in an autoclave with liquid $CO_2$, taken out at the end as a supercritical fluid (SCF). As-prepared interpenetrating networks are referred to as PBO-FeOx. Because for isomorphic, high-yield carbonization, PBO networks need to be oxidized, PBO-FeOx aerogels were step-cured up to 200° C. in air and are referred to as PBO-FeOx-200. To highlight the advantages of the present invention, the inventors prepared several "controls" including a pure FeOx aerogel which was prepared via the same route (FIG. 14, minus BO monomer) and are referred to as FeOx. For consistency, FeOx aerogels were also cured at 200° C. in air, and are referred to as FeOx-200. Also for control purposes, PBO aerogels were prepared using $FeCl_3 \cdot 6H_2O$ as a catalyst (FIG. 14, minus epichlorohydrine), and are referred to as PBO—$Fe^{3+}$. After curing at 200° C., those samples are referred to as PBO—$Fe^{3+}$-200.

Scheme 4: Chemical Processes Forming the Interpenetrating Networks

Part A: Formation of the FeOx network

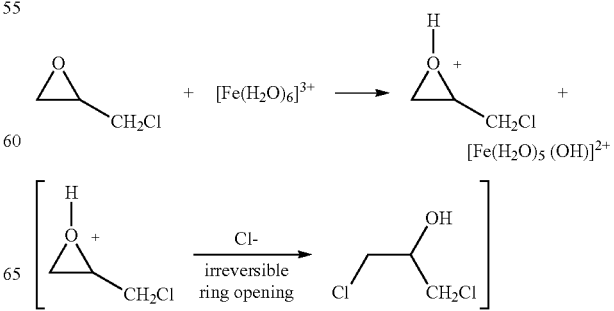

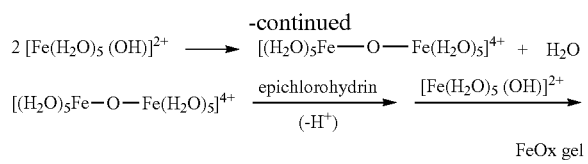

FeOx gel

Part B: Formation of the PBO network

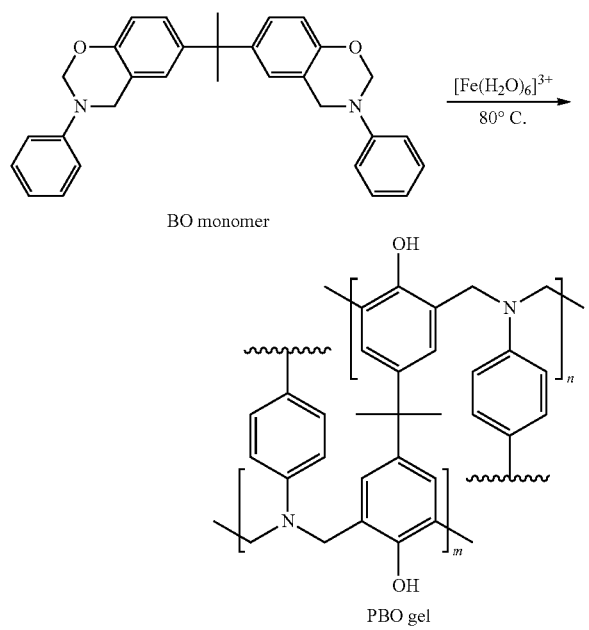

PBO gel

The PBO-FeOX-200 aerogel of the present invention, along with control aerogels of the prior art, were characterized and compared using thermogravimetric analysis in air (TGA-FIG. 15) and CHN analysis. As-prepared FeOx aerogels show a gradual mass loss of 16% w/w up to 300° C., which has been attributed to "physisorbed and structural water, as well as organic byproducts of the initial synthesis." Both as-prepared PBO-FeOx and cured PBO-FeOx-200 IPNs loose about the same mass (37% and 35% w/w, respectively), most of which above 300° C. Thermogravimetrically, the PBO-$Fe^{3+}$-200 control sample behaves similarly to the IPNs, and surprisingly (that is in view of RF-related reports) they also show a substantial uptake of iron (25% w/w residual weight, vs. 63-65% from IPNs). (It is noted that acid-catalyzed PBO-A-7-200 is burnt off completely, again starting loosing weight >300° C.) Those data together point to strong interactions between $Fe^{3+}$ and the PBO network that may have replaced interactions with physisorbed water.

FeOx-200 controls were pyrolyzed further under flowing $H_2$ and was found that they undergo reduction to iron(0) at as low as 400° C.; however, the resulting samples had shrunk a lot and were no longer monolithic.

In the carbothermal route, the PBO network is used both as a template and as a reducing agent. For that purpose, PBO-FeOx-200 aerogels were first pyrolyzed at 800° C. under flowing high-purity Ar. By TGA (FIG. 15), both Fe(0)/C and terminal Fe(0) samples gain weight up to 800° C.: 38.6% and 43.5%, respectively. XRD analysis shows no other crystalline phase (e.g., oxides) in any of those samples, and CHN analysis gave 5.45±0.85% of residual carbon in Fe(0)/C, and 0.07±0.01% in Fe(0). By assuming no other contaminant in Fe(0)/C but carbon, and by employing XRD to confirm that the TGA product was $\alpha$-$Fe_2O_3$, the weight gains observed in TGA were used to calculate the percent mass of iron(0) in Fe(0)/C and Fe(0). Those values were found equal to 96.7±0.5% and at 100.5±0.1, respectively, i.e., in agreement with the results from CHN analysis. Furthermore, the skeletal density of Fe(0) (7.749±0.054 g $cm^{-3}$) agrees also well with the bulk density of $\alpha$-Fe (7.874 g $cm^{-3}$).

For characterization purposes, in selected runs, the 600° C./air carbon-removal step was followed by direct cooling to ambient temperature under Ar; those samples are referred to as $Fe_2O_3$/Fe(0). Also, in other runs the 600° C./air treatment was followed by a $H_2$-reduction step at 1200° C. The purpose of that process was to densify iron aerogels in order to increase their strength for thermite applications. Those samples are referred to as Fe(0)-1200.

A comprehensive materials characterization, from the processing of identified samples, is summarized in Table 5. Overall, in terms of shrinkage up to 200° C., PBO-FeOx-200 behaves very similarly (21.6±0.2%) to the controls (15-22%). Significant shrinkage (53%) is noted after carbothermal reduction, but interestingly manipulations to remove unreacted carbon [i.e., Fe(0)/C→$Fe_2O_3$/Fe(0)→Fe(0)] had little relative effect on the sample size (shrinkage 53→59%). Large differential shrinkage is observed with samples processed at 1200° C. (Fe(0)-1200, 76%) versus those at 800° C. (Fe(0), 59%), pointing to annealing effects. Porosities (as percent of empty space) are uniformly high (>90% v/v), both in the controls and in the IPNs through carbothermal processing, dropping to 66% v/v only in the 1200° C.-processed samples (Fe(0)-1200). The porosity of Fe(0) was 93% v/v. BET surface areas, o, were generally high in the as-prepared FeOx and cured FeOx-200 controls (in the 300-400 $m^2g^{-1}$ range), pointing to relatively small particles.

The surface area of the PBO-$Fe^{3+}$ controls was low (only 10-20 $m^2g^{-1}$), yet in accord with the surface area of HCl-catalyzed PBO aerogels (as a result of relatively large skeletal particles). The particle size-based argument for the trends in the surface area is supported by particle size calculations using radius=3/$\rho_s\sigma$ ($\rho_s$: skeletal density; results are included in Table 4), however, it is noted also that this calculation is in need of independent evaluation (see next section), because $\sigma$ and the particle size are not linearly independent. The BET surface area of PBO-FeOx and PBO-FeOx was also high (270-290 $m^2$ $g^{-1}$), presumably because of the FeOx network The surface area of Fe(0)/C was still relatively high (78 $m^2$ $g^{-1}$), but it dropped precipitously after removal of carbon (to 6.6 $m^2$ $g^{-1}$ in Fe(0)), suggesting, qualitatively, that most of the surface area in Fe(0)/C was associated with the residual carbon. Similarly, the overall $N_2$-sorption isotherms (shown in FIG. 16) indicate mostly macroporous materials, which is confirmed via average pore diameter considerations: values for the latter calculated via the 4$V_{Total}$/$\sigma$ method using for the total pore volume, $V_{Total}$, either the single highest amount of $N_2$ adsorbed on the isotherm, or the value calculated via $V_{Total}$=(1/$\rho_b$)−(1/$\rho_s$), diverge greatly after removal of unreacted carbon (see Table 5).

TABLE 5

Properties of PBO-FeOx Interpenetrating Networks and Controls

| Aerogel | Linear shrinkage [%] [a, b] | Bulk density $\rho_b$ [g cm$^{-3}$] [a] | Skeletal density $\rho_s$ [g cm$^{-3}$] [c] | Porosity Π [% v/v] | BET Surface area, σ [m$^2$ g$^{-1}$] | Average pore diameter [nm] via 4 V/σ [d] | | particle radius r [nm] [f] |
|---|---|---|---|---|---|---|---|---|
| | | | | | | [d] | [e] | |
| *Control Aerogels* | | | | | | | | |
| FeOx | 15.2 ± 0.7 | 0.110 ± 0.032 | 3.295 ± 0.054 | 97 | 407 | 28.3 | 86.4 | 2.2 |
| FeOx-200 | 22.2 ± 0.8 | 0.131 ± 0.053 | 3.916 ± 0.046 | 97 | 299 | 32.4 | 98.7 | 2.6 |
| PBO-Fe$^{3+}$ | 18.4 ± 0.9 | 0.120 ± 0.006 | 1.393 ± 0.006 | 91 | 12.3 | 35.6 | 2480 | 175 |
| PBO-Fe$^{3+}$-200 | 21.2 ± 0.5 | 0.127 ± 0.003 | 1.471 ± 0.013 | 91 | 19.7 | 9.8 | 1460 | 104 |
| *Interpenetrating Networks* | | | | | | | | |
| PBO-FeOx | 15.$_9$ ± 1.$_1$ | 0.156 ± 0.018 | 2.607 ± 0.015 | 94 | 273 | 17.3 | 88.3 | 4.2 |
| PBO-FeOx-200 | 21.6 ± 0.2 | 0.174 ± 0.010 | 2.579 ± 0.065 | 93 | 296 | 20.0 | 72.7 | 3.9 |
| Fe(0)/C | 53.4 ± 0.4 | 0.365 ± 0.040 | 6.542 ± 0.052 | 95 | 78.3 | 12.9 | 133 | 5.9 |
| Fe$_2$O$_3$/Fe(0) | 55.1 ± 0.3 | 0.552 ± 0.011 | 5.253 ± 0.016 | 89 | 2.26 | 32.0 | 2830 | 250 |
| Fe(0) | 59.2 ± 0.6 | 0.542 ± 0.068 | 7.749 ± 0.054 | 93 | 6.57 | 13.3 | 1120 | 58.9 |
| Fe(0)-1200 | 76.0$_4$ ± 0.9$_9$ | 2.61$_6$ ± 0.11$_1$ | 7.626 ± 0.178 | 66 | 0.37 | 4.1 | 2720 | 1060 |

[a] Average of three samples.
[b] Shrinkage = 100 × (mold diameter − sample diameter)/(mold diameter).
[c] Single sample, average of 50 measurements.
[d] The specific pore volume (cm$^3$ g$^{-1}$), V, was calculated via the single point adsorption method from the N$_2$-sorption isotherm.
[e] V was set equal to the total pore volume, $V_{Total} = (1/\rho_b) − (1/\rho_s)$.
[f] Calculated via r = 3/$\rho_s$ σ.

As depicted in the SEM images of FIG. 17, PBO-FeOx-200 and the two controls, FeOx-200 and PBO-Fe$^{3+}$-200, all consist of particles. Particles in PBO-Fe$^{3+}$-200 are much larger than those in FeOx-200; Particles in PBO-FeOx-200 are about the same size to those in PBO-Fe$^{3+}$-200, but are decorated with smaller particles of about the same size as in FeOx-200. STEM of PBO-FeOx-200 shows darker interconnected aggregates, presumably of FeOx embedded in lighter matter (PBO). Neither SEM nor TEM are conclusive about formation of independent PBO and FeOx networks.

Rheology and DMA were done in tandem to follow the gelation of the first network and detect the possible gelation of the second network. Rheometry was conducted in the multi-wave oscillation mode. As demonstrated, with one frequency (after deconvolution of the data—see FIG. 18A), the elastic (G') and viscous (G") moduli of the sol cross one another (near the gel point), as expected. The formal gelation time is identified at the common crossing point of all tan δ (=G"/G'), at all oscillating frequencies employed. For better accuracy, that common crossing point was identified at the minimum of the statistical function Log [s/<tan δ>], as a function of time, t, (FIG. 18B), whereas s is the standard deviation and <tan δ> is the average value of tan δ at each sampling time, t. Data for the FeOx, PBO-Fe$^{3+}$ and PBO-FeOx sols are summarized in Table 6. It is noted that in all cases, the phenomenological and actual gelation times were very close, indicating absence of thixotropic phases. The common tan δ values at the respective gelation points were used to calculate the gel exponents, n, which, in turn, were used to calculate the mass fractal dimensions, $D_f$, of the particles forming each gel framework. Those fractal dimensions express how matter fills space and are fingerprint-type physical constants of particle aggregates, allowing their tracking and identification as the structure evolves. It is noted that both the gelation time, and the $D_f$ value of the PBO-FeOx sol closely match the values of the FeOx sols, meaning that the FeOx network is formed first, with minimum interference, from the BO monomer.

TABLE 6

Rheological and Dynamic Mechanical Analysis Data at 80° C.

| sols | $t_{g-phen}$ [a] (min) | rheology | | | | DMA | | | |
|---|---|---|---|---|---|---|---|---|---|
| | | $t_{g-rheom}$ [b] (min) | tan δ @ $t_{g-rheom}$ | n [c] | $D_f$ [d] | $t_{DMA}$ [e] (min) | tan δ @ $t_{DMA}$ | n [c] | $D_f$ [d] |
| FeOx | 8-10 | 8 | 0.13 | 0.08 | 2.42 | [f] | [f] | [f] | [f] |
| PBO-Fe$^{3+}$ | 280- | 275 | 0.28 | 0.17 | 2.35 | [f] | [f] | [f] | [f] |
| PBO-FeOx | 18-20 | 16 | 0.16 | 0.10 | 2.41 | 65 | 0.31 | 0.19 | 2.32 |

TABLE 6-continued

Rheological and Dynamic Mechanical Analysis Data at 80° C.

| | Primary Particles | | | | Secondary Particles | |
|---|---|---|---|---|---|---|
| sample | high-Q slope [a] | $R_G(1)$ [b] (nm) | $R(1)$ [c] (nm) | $D_m$ [d] | $R_G(2)$ [e] (nm) | $R(2)$ [c] (nm) |
| FeOx-200 | −4.00 ± 0.11 | 4.8 ± 0.2 | 6.2 ± 0.3 | 2.6 ± 0.6 | 21 ± 3 | 27 ± 4 |
| PBO-A-7-200 [f] | −4.35 ± 0.01 | 35 ± 1 | 45 ± 1 | [g] | [g] | [g] |
| PBO-FeOx-200 | −4.00 ± 0.05 | 5.6 ± 0.2 | 7.3 ± 0.3 | 2.3 ± 0.5 | 46 ± 3 | 60 ± 4 |

[a] Slopes < −4.0, signifying primary particles with density-gradient boundaries.
[b] Radius of gyration of primary particles, $R_G(1)$, from first Guinier knee (see FIG. S.3).
[c] Particle radii = $R_G/0.77$.
[d] Mass fractal dimension of secondary particles, $D_m$, equal to the |slope| of the low-Q power-law along the scattering profile.
[e] Radius of gyration of secondary particles, $R_G(2)$, from second Guinier knee (see Supplementary FIG. S.3).
[f] Values taken from the previous paper of this issue for the approximate density-matched acid-catalyzed PBO network (considering a ~40% BO monomer mass loss during solvent exchange washings).
[g] Not accessible within the Q-range available.

Subsequently, in DMA (in the multifrequency compression mode, FIG. 18C), the elastic and viscous moduli of the resulting gels did not cross (as also expected), however, the elastic modulus shows an abrupt and rapid increase, at about the same time at all frequencies. Again, all tan δ values cross at a point that was identified accurately from a plot of the statistical function (Log [s/<tan δ>]t) as a function of time (FIG. 18D). That crossing point matches very well, timewise, with the stabilization of the pH (at 5.5) inside the PBO-FeOx wet-gels (FIG. 18E). In turn, that pH value matches well with the $pK_a$ value of N,N'-dimethylaniline (5.15, in water), and is attributed to the buffering effect of the (dimethylaniline-like) Mannich bases formed from the ring opening polymerization of the BO monomer (Scheme 4B).

Considering those two pieces of evidence together suggests that in the present invention an independent PBO network is formed inside the pores of the FeOx gel. Additional evidence for the identity of the second network is provided by the Dr value of the particles that form it, which agrees with the $D_f$ value of the PBO-$Fe^{3+}$ gel, as derived from rheology (Table 6). The difference in the $t_{g-rheom}$ (of PBO-$Fe^{3+}$) and $t_{DMA}$ (of PBO-FeOx) (275 min versus 65 min, respectively) might be attributed to the different catalytic activity of $[Fe(H_2O)_6]^{3+}$ versus the FeOx sol. Based on the conclusions from rheology/DMA, the two gel components form two networks successively.

As pointed out, however, this is hardly evident from SEM. Thus, a post-gelation quantitative evaluation of the fundamental building blocks of the two networks was obtained with small angle x-ray scattering (SAXS). Results for PBO-FeOx-200 along with the control samples are summarized in Table 6. The radii of the smallest particles in PBO-FeOx-200 match those of the primary particles in the FeOx-200 controls (7.3 and 6.2 nm, respectively). A second distinguishing feature of those particles is their abrupt interfaces (high-Q slopes=−4.0; Q scattering vector), while particles in all acid-catalyzed PBO aerogels have density-gradient (fuzzy) interfaces (high-Q slope=−4.4) and are much larger (with radii around 45 nm).

Analysis of the scattering profiles at lower Q-values shows that primary particles in the FeOx-200 control samples form secondary particles of about 27 nm in radius and a mass fractal dimension ($D_m$=2.6±0.6). FeOx-200 shrink an additional 46% in linear dimensions relative to as-prepared FeOx (see Table 5), which is expected to cause a significant rearrangement at the secondary particle level by penetration of primary particles of one secondary particle into the fractal space of another. The fractal dimension corresponding to the low-(slope of PBO-FeOx-200, $D_m$=2.3±0.5, matches (within error) that of the assembly of FeOx primary into secondary particles ($D_m$=2.6±0.6-see above), but the radius of the next-size moiety (60±4 nm) does not correspond to the radius of the FeOx secondary particles (27±4 nm). Instead, that radius fits better with: (a) the SAXS radius of the PBO particles in PBO-A-7-200 (45 nm); and, (b) the size of the SEM particles of PBO-$Fe^{3+}$-200, or of the larger entities in PBO-FeOx-200 (FIG. 17).

Rheology/DMA/SAXS data together suggest that formation of the second network (PBO) disrupts the FeOx network at the secondary particle level. This is not difficult to reconcile: since the FeOx network is formed first, polymerization of the BO monomer is catalyzed mainly by the acidic surface —Fe—O—H groups, which are mostly located within secondary particles. (It is noted that most of the surface area in hierarchical structures is found within the fractal aggregates.) As depicted in FIG. 19, the fractal network of primary particles (dark circles) within a secondary FeOx nanoparticle. FIGS. 19(B, C, and D) illustrates the growing PBO (light circles) polymer out of the surface of primary FeOx nanoparticles, inside secondary FeOx nanoparticles. Further, when PBO nanoparticles grow large, they disrupt the FeOx network and still interconnected FeOx primary particles.

As depicted in FIG. 20, in FTIR PBO-$Fe^{3+}$ controls show the characteristic out-of-plane C—H bending absorption of para-substituted aniline at 825 $cm^{-1}$ (compare with the spectrum of the acid-catalyzed PBO-A-7-RT), confirming that the polymerization mechanism is acid-catalyzed, as designed by the current invention. That 825 $cm^{-1}$ absorption becomes weaker in the PBO-$Fe^{3+}$-200 samples, consistent with oxidation processes that involve ring-closure along the polymeric backbone, between para-substituted aniline and phenol (see Scheme 2). Taking into consideration the lower absorption intensities (due to the "dilution" effect of FeOx), the same observations extend to PBO-FeOx and its cured counterpart, PBO-FeOx-200. The FTIR spectrum of as-prepared PBO-FeOx is identical to that of PBO-200 (FIG. 20), but after curing, PBO-FeOx-200 shows a distinctly different pattern with a single maximum absorption at 585 $cm^{-1}$ (pointed with an arrow) that is assigned to the Fe—O lattice mode in $Fe_3O_4$. Presence of $Fe_3O_4$ after curing at 200° C., means that the FeOx network is involved in the oxidation of PBO, itself getting reduced.

As depicted in FIG. 21, the Mössbauer spectra (black dotted solid lines) of PBO-FeOx-200_(Air) aerogels show a dramatic decrease of $Fe^{3+}$ in 8-hedral co-ordination accompanied by a small further increase of $Fe^{3+}$ in 4-hedral sites, but most importantly by a new component (sextet) with a magnetic hyperfine field, $H_{hf}$=454 kOe. That hyperfine splitting fits only to the B-sites (octahedral $Fe^{2+}Fe^{3+}$) of $Fe_3O_4$, however, the associated hyperfine splitting expected simultaneously from $Fe^{3+}$ in the A-(tetrahedral) sites of $Fe_3O_4$ could not be detected. In summary, Mössbauer data so far suggest that the new sextet belongs to the reduction product of FeOx with PBO.

The Mössbauer spectra of those PBO-FeOx-200_(Ar) samples show a similar percentage of 4-hedrally coordinated $Fe^{3+}$ as in PBO-FeOx-200_(Air) (58% vs. 59%, respectively), and a similar reduction in the 8-hedral site population of $Fe^{3+}$ (17% vs. 13%, respectively, relative to 46% in PBO-FeOx-refer to Table 7). However, unlike PBO-FeOx-200_(Air), no hyperfine slitting is observed in PBO-FeOx-200_(Ar), and the reduced number of 8-hedral sites for $Fe^{3+}$ is accompanied by the appearance of two new doublets (d3 and d4) with $\delta_{d3}$=0.780 mm s$^{-1}$ ($\Delta$=1.070 mm s$^{-1}$) and $\delta_{d4}$=1.170 mm s$^{-1}$ ($\Delta$=1.800 mm s$^{-1}$). Doublet d4 (relative atomic contribution: 7.7%) is attributed to 4-hedrally coordinated $Fe^{2+}$ (expected $\delta$=0.989-1.208 mm s$^{-1}$ with $\Delta$=1.780-2.490 mm s$^{-1}$). The origin of doublet d3 (relative contribution: 17.3%) is ambiguous as its chemical isomer shift value $\delta$=0.780 mm s$^-$ lies in between the $Fe^{2+}$ and $Fe^{3+}$ oxidation states. Overall, since iron in FeOx-200 remains in the +3 oxidation state, it is clear from PBO-FeOx-200_(Air) and PBO-FeOx-200_(Ar) that the +2 oxidation state is due to the presence of PBO. Hence, in conclusion FeOx is involved directly in the oxidation of the PBO network, which, as demonstrated earlier, is essential for its ability to carbonize.

spectrum is identified with $Fe_3O_4$. In SEM, the oxide appears as large, randomly oriented and apparently interconnected crystals, embedded in amorphous material (carbon). To form micron-size crystals, $Fe_3O_4$ needs to melt, but that should occur at a more-than-800° C. lower temperature than the melting point of the bulk material (m.p.=1,597° C.). For control purposes, FeOx-200 (an amorphous material as well) was also heated under Ar at 800° C.; the only crystalline phase there was $\alpha$-$Fe_2O_3$ (FIG. 22), and again SEM shows evidence of annealing (larger particles with wider necks—compare FIG. 22 with FIG. 17). (It is noted that the m.p. of $\alpha$-$Fe_2O_3$ is 1,566° C.) Low-temperature annealing of iron oxide ribbons (250-400° C.) and films (400-700° C.) has been observed before. Annealing is attributed to surface melting phenomena, whose effectiveness depends on particle size (actually on the surface-to-volume ratio) and have led to the advancement of the melt-dispersion reaction mechanism.

By heating PBO-FeOx-200 to 800° C. under the flowing Ar, the XRD spectrum shows $\alpha$-Fe as the only crystalline phase, and those samples contain 4-5.5% carbon and are denoted as F(0)/C. According to SEM (FIG. 23), iron(0) forms a continuous network, which, under high magnification, shows crystallites fused together, as from partial melting. Analysis of the (110) diffraction peak using the Scherrer equation is inherently inaccurate due to the large size of the crystallites, but in the broad sense results agree with SEM (sizes >250 nm). Residual carbon appears as minor debris segregated and localized randomly at various spots of the network.

TABLE 7

Mössbauer Spectroscopy Data for Indicated Samples

| Sample | | $\delta^a$ (mm s$^{-1}$) | $\Delta$ or $\varepsilon^{*\,b}$ (mm s$^{-1}$) | $\Gamma^c$ (mm s$^{-1}$) | $H_{hf}^d$ (kOe) | State of iron | Type of site $^g$ | Site % |
|---|---|---|---|---|---|---|---|---|
| FeOx-200 | Doublet 1 | 0.343 | 1.005 | 0.538 | $e$ | $Fe^{3+}$ | 8-hedral | 48.0 |
| | Doublet 2 | 0.346 | 0.497 | 0.461 | $e$ | $Fe^{3+}$ | 4-hedral | 52.0 |
| PBO-FeOx | Doublet 1 | 0.346 | 0.955 | 0.513 | $e$ | $Fe^{3+}$ | 8-hedral | 46.0 |
| | Doublet 2 | 0.349 | 0.492 | 0.496 | $e$ | $Fe^{3+}$ | 4-hedral | 54.0 |
| PBO-FeOx-200 (Air) | Doublet 1 | 0.380 | 1.150 | 0.590 | $e$ | $Fe^{3+}$ | 8-hedral | 13.0 |
| | Doublet 2 | 0.363 | 0.610 | 0.594 | $e$ | $Fe^{3+}$ | 4-hedral | 58.8 |
| | Sextet | 0.613 | 0.062 | 1.454 | 454.0 | $Fe_3O_4$ | $h$ | 28.7 |
| PBO-FeOx-200 (Ar) | Doublet 1 (d1) | 0.351 | 0.995 | 0.448 | $e$ | $Fe^{3+}$ | 8-hedral | 17.0 |
| | Doublet 2 (d2) | 0.349 | 0.563 | 0.506 | $e$ | $Fe^{3+}$ | 4-hedral | 58.0 |
| | Doublet 3 (d3) | 0.780 | 1.070 | 0.654 | $e$ | $Fe^{3+}/Fe^{2+\,f}$ | $f$ | 17.3 |
| | Double 4 (d4) | 1.170 | 1.800 | 0.780 | $e$ | $Fe^{3+}$ | 4-hedral | 7.7 |
| Fe(0) | Doublet | 0.402 | 0.814 | 0.395 | $e$ | $Fe^{3+}$ | 4-hedral | 4.2 |
| | Sextet | -0.000$_1$ | 0.000$_0$ | 0.353 | 329.8 | $Fe^0$ | $h$ | 95.8 |

$^a$ $\delta$: Chemical isomer shift versus an iron foil standard ($\alpha$-Fe).
$^b$ $\Delta$: quadrupole splitting vs. $Fe^0$; $\varepsilon^*$: quadrupole isomer shift (for magnetically ordered materials) versus $\alpha$-Fe.
$^c$ Full width at half maxima.
$^d$ Magnetic hyperfine field.
$^e$ Not detected.
$^f$ See text.
$^g$ Tetrahedral (4-hedral): coordination number = 4; Octahedral (8-hedral): coordination number = 6.
$^h$ Not relevant.

FIG. 22 depicts X-ray diffraction (XRD) analysis along pyrolysis of PBO-FeOX-200 and other identified samples. The corresponding SEM images (of the indicated aerogels) are shown in FIG. 23.

Cured PBO-FeOx-200 aerogels appear amorphous with only weak bumps over the baseline (marked with asterisks) corresponding to diffractions from the (311) and (440) planes of $Fe_3O_4$. Upon heating at 600° C. under Ar [sample denoted as PBO-FeOx-200 @ 600° C. (Ar)], the XRD PBO-FeOx samples were pyrolyzed directly at 800° C. under Ar, and the product consists mostly of $\alpha$-Fe together with a very small amount of $Fe_3O_4$. Since the data above show that PBO-FeOx-200 is first converted to $Fe_3O_4$ and then $\alpha$-Fe, we conclude that the original PBO-FeOx samples contained enough PBO to reduce the entire amount of FeOx to $Fe_3O_4$, however, for converting all of that $Fe_3O_4$ to $\alpha$-Fe, slightly more carbon than that produced from the equivalent amount of oxidized PBO was needed. Therefore, it is concluded that the air-oxidation step is necessary in order to ensure complete convertion of all PBO in PBO-FeOx to its carbonizable oxidized form.

The residual carbon in Fe(0)/C was removed at 600° C. under flowing air. By XRD, those samples (denoted as $Fe_2O_3/Fe(0)$) consisted of $\alpha$-$Fe_2O_3$ and $\alpha$-Fe(0), in 89:11 w/w ratio (by quantitative phase analysis of the XRD spectrum of FIG. 22). In SEM, the network appears similar to that of Fe(0)/C, although the thickness of the network walls is somewhat larger. No crystallites are visible under higher magnification. $\alpha$-$Fe_2O_3$ was reduced back to iron(0) by switching the flowing gas to $H_2$. XRD of the Fe(0) terminal samples shows only one crystalline phase ($\alpha$-Fe), and the lattice appears defect-free: the distance between (110) planes (via HRTEM—included in FIG. 23) is equal to 0.21 nm throughout the sample. In SEM, Fe(0) retain the general porous structure of their immediate precursor ($Fe_2O_3/Fe(0)$). Under higher resolution, Fe(0) show some crystalline protrusions out of their smooth surfaces, which, however, are larger and fewer than those in as-prepared Fe(0)/C.

Although TGA, CHN analysis and skeletal density considerations of Fe(0) point to pure iron, the Mössbauer spectrum (FIG. 21) shows a superposition of the metallic iron sextet with a magnetic hyperfine field of 329.8 KG, and a quadrupole doublet assigned to $Fe^{3+}$ in octahedral coordination. The relative Fe(0): $Fe^{3+}$ site population was 96:4 (see Table 6). Since XRD of Fe(0) shows no other crystalline phase than $\alpha$-Fe, and since there is no other indication for impurities, the presence of $Fe^{3+}$ is attributed to amorphous surface oxide formed during the long exposure of the sample to the air during Mössbauer spectroscopy.

Industrial iron-making involves reduction of iron ore (oxides) with carbon in blast furnaces. Both in the so-called direct reduction process, and in the pre-reduction stage of the smelting process the reducing agent is CO, which is produced by oxidation of carbon with air. Reduction by CO takes place stepwise from $Fe_2O_3$ (hematite) to $Fe_3O_4$ (magnetite), to FeO, to Fe(0). In the smelting process the bulk of the reduction takes place in molten iron that dissolves carbon. Hence, smelting is inherently a high-temperature process. Here, taking into consideration that: (a) reduction of FeOx aerogels at 800° C. under flowing CO gave only iron carbide ($Fe_3C$) and graphite; (b) the gradual decrease of the amount of the remaining carbon with increasing pyrolysis temperature from 200° C. to 700° C. (via CHN analysis); (c) the concomitant dominance of $Fe_3O_4$ as the only crystalline phase below 800° C. and the associate annealing phenomena discussed above; and, (d) literature reports on mechanochemical studies with, for example, Al and C, showing a 800° C. decrease of the synthesis temperature of $Al_4C_3$ and suggesting a mechanism change from liquid-solid (case of high temperature reaction of bulk Al and C) to solid-solid, the inventors postulate a pre-reduction-like process between PBO (or its decomposition products) and FeOx below 800° C. whereas the oxide is transformed gradually into $Fe_3O_4$, followed by a solid(C)-liquid($Fe_3O_4$) reaction at the interface of the two materials. In that scheme, the role of the product, iron(0), should not be underestimated either: iron (0) (m.p.: 1,538° C.), is expected to undergo surface-melting as well, solubilizing the remaining carbon thus facilitating smelting in the classical sense. Annealing of iron(0) is already observed in Fe(0) (FIG. 23), but if the final reduction of $Fe_2O_3/Fe(0)$ is carried out at 1,200° C. (instead of 600° C.—all other conditions kept the same: $H_2$/5 h), annealing phenomena are enhanced and the solid framework of the resulting Fe(0)-1200 samples consists of thicker, completely structureless filaments with larger pores (FIG. 23). Those annealing-related structural changes are responsible for the excessive shrinkage observed in Fe(0)-1200 (76%-see Table 4 and photograph in FIG. 24 below). However, it is also reminded that the porosity in annealed Fe(0)-1200 still remains relatively high (66% v/v), hence Fe(0)-1200 can be infiltrated easily with oxidizers.

As depicted in FIG. 24A, infiltration with $LiClO_4$ of the Fe(0) aerogel (monoliths with a density of 0.54±0.07 g cm$^{-3}$ and 93% porosity) and ignition led to a new type of explosive behavior due to the rapid heating and expansion of gases filling nanoporous space. As depicted in FIG. 24B, once ignited, the $LiClO_4$ infused Fe(0)-1200 (aerogel that had been annealed at 1200° C., with a reduced porosity to 66%) behave as thermites, rather than exploding.

As shown in FIG. 24A, Fe(0)/LiClO4 samples explode violently. Because the reaction of iron(0) with $LiClO_4$ should not evolve gases, explosive behavior was not expected. (It is noted that heating $LiClO_4$ by itself under the same conditions leads only to melting.) Since Fe(0) aerogels are 93% porous (Table 5), it was reasoned that the explosion was caused by rapid heating and expansion of the pore-filling air. Indeed, repeating that experiment with much less porous Fe(0)-1200/$LiClO_4$ (FIG. 24B) yielded a totally different behavior: Fe(0)-1200/$LiClO_4$ samples do not explode, instead glow for a few seconds and remain monolithic. The process was repeated 3 times in a bomb calorimeter. Residues were collected and analyzed with XRD for residual iron(0) and products. The heat released was quantified at 59±9 Kcal mol$^{-1}$ of iron reacted, in agreement with: (a) $4Fe+LiClO_4 \rightarrow 4FeO+LiCl$ (66.64 Kcal mol$^{-1}$), thus confirming independently the XRD results showing FeO as the only iron-related product in the bomb calorimeter experiment; and, (b) literature report on the reaction of iron with $KClO_4$ showing formation of only FeO. Notably, XRD analysis of the products from ignition of Fe(0)/$LiClO_4$ in air (FIG. 24A or 23B) shows a mixture of both $Fe_3O_4$ and FeO, hence pointing to a pyrotechnics-like participation of air in the combustion process, namely via $3Fe+2O_2 \rightarrow Fe_3O_4$, or $3FeO+(\frac{1}{2})O_2 \rightarrow Fe_3O_4$. Since overall oxidation of iron to $Fe_3O_4$ is a more exothermic process (91.3 Kcal mol$^{-1}$ of iron reacted), those reactions intensify the violent explosion in FIG. 24A, and can be desirable, depending on the application.

As exemplified with the monolithic iron aerogels, the present invention teaches the use of polybenzoxazine (PBO) aerogels as sacrificial templates for the carbothermal synthesis of nanoporous pyrophoric metallic aerogels. Again, this is achieved by forming interpenetrating networks (IPNs) of PBO with metal oxide, using the newly discovered Brønsted-acid catalysis of the ring opening polymerization of benzoxazine monomers. Though the process follows age-old smelting principles, those processes behave differently in nanoscale, aerogel regime, permitting all processes to be carried out at over 800° C. lower temperatures than those in the classical process.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A method for producing acid catalyzed Polybenzoxazine ("PBO") nanoporous Aerogels comprising the steps of:
    a) Creating Benzoxazine ("BO") monomers;
    b) Polymerizing the BO monomers using HCL as a catalyst by:
        i) Combining the BO monomers in a solvent containing HCL to form a sol;
        ii) pouring the sol into molds;
        iii) allowing gelation to form wet-gels;
        iv) Aging the gels for from six hours to 1.2 days, at room temperature;
        v) Washing the gels with DMF;
        vi) Drying the gels with super critical fluid $CO_2$, said $CO_2$ then being removed while a supercritical fluid (SCF), thereby forming PBO nanoporous Aerogels;
        vii) Step-curing the PBO nanoporous Aerogels in the air at successive temperatures of 160° C. for 1 hr; and then at 180° C. for 1 hr; and then at 200° C. for 24 hrs; and
    c) Carbonizing the PBO nanoporous Aerogels by pyrolysis in Ar at 800° C.

2. A method for producing pure nanoporous metal aerogels using an interpenetrating Polybenzoxazine network comprising the steps of:
    a) Creating BO monomers;
    b) Synthesizing substantially pure nanoporous metal aerogel:
        i) Dissolving the BO monomers in an organic solvent to form a BO monomers containing organic solvent solution and mixing the BO monomers containing organic solvent solution with ferric chloride and epichlorohydrin to form a combined solution;
        ii) Mixing the combined solution and allowing to generate gels in a wet state;
        iii) Aging the gels;
        iv) Washing the gels;
        v) Drying the gels with supercritical fluid $CO_2$, said $CO_2$ then being removed while a supercritical fluid (SCF), thereby forming aerogels;
        vi) Step-curing the aerogels in the air at 160° C. for 1 hr.; and then at 180° C. for 1 hr, and then at 200° C. for 24 hrs;
        vii) Carbonizing and smelting of the aerogels by purging with Ar gas at room temperature (1 h); increasing the temperature from room temperature to an annealing temperature (>700° C.) under Ar; and, allowing the aerogels to stand at the desired annealing temperature under Ar until annealed;
        viii) Removing unreacted carbon from the aerogels by reducing the temperature from the annealing and switching from Ar to air; and,
        ix) Reducing the remaining metal oxide to pure metal by changing the infusion gas from air to hydrogen and reducing the temperature back to room temperature.

3. A method for producing an acid-catalyzed polybenzoxazine (PBO) nanoporous aerogel comprising the steps of:
    a) creating benzoxazine (BO) monomers;
    b) polymerizing the BO monomers using a strong inorganic acid as a catalyst, the polymerizing comprising:
        i) dissolving a concentration of the BO monomer in a solvent containing HCL,
        ii) mixing the solution,
        iii) gelling the solution at room temperature, thereby forming a gel;
        iv) aging the gel;
        v) washing the gel;
        vi) supercritically drying the gel using $CO_2$ as a supercritical fluid (SFC), thereby forming an aerogel;
        vii) step-curing the aerogel in the air at 160° C. for 1 hr.; and then at 180° C. for 1 hr, and then at 200° C. for 24 hrs, thereby forming the PBO aerogel, and
    c) carbonizing the PBO aerogel by pyrolysis in argon at 800° C. for a period of time.

4. A method for producing a pure nanoporous metal aerogel using an interpenetrating polybenzoxazine (BO) network comprising the steps of:
    a) creating BO monomers;
    b) synthesizing a substantially pure nanoporous metal aerogel, the synthesizing comprising:
        i) dissolving the BO monomer in an organic solvent, wherein the organic solvent contains ferric chloride- and epichlorohydrin, thereby forming a solution;
        ii) mixing the solution and allowing it to gelate to form a wet-gel;
        iii) aging the wet-gel;
        iv) washing the aged wet-gel;
        v) supercritically drying the aged and washed wet-gel using liquid $CO_2$ as a supercritical fluid (SCF), thereby forming an aerogel;
        vi) step-curing the aerogel in air at 160° C. for 1 hr, and then 180° C. for 1 hr, and 200° C. for 24 hr, thereby forming a cured aerogel;
        vii) carbonizing and smelting of the cured aerogel by purging with argon gas at room temperature; then increasing the temperature from room temperature to a temperature >700° C. under the argon gas; and then annealing the aerogel under the argon gas for a number of hours;
        viii) removing unreacted carbon from the annealed aerogel by reducing the temperature from the annealing temperature and switching from the argon to air; and,
        ix) reducing any metal oxide present in the annealed aerogel to pure metal by changing the infusion gas from air to hydrogen and reducing the temperature to room temperature.

* * * * *